(12) United States Patent
McClive et al.

(10) Patent No.: US 10,108,273 B2
(45) Date of Patent: Oct. 23, 2018

(54) MOVEMENT SPACE MAPPING FOR CONTROL STICKS IN USER INPUT DEVICES

(71) Applicant: Microsoft Technology Licensing, LLC, Redmond, WA (US)

(72) Inventors: Curtis F. McClive, Kirkland, WA (US); Aaron J. Schmitz, Redmond, WA (US); Ross Anthony Nelson, Seattle, WA (US); Anthony John Grant, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/062,481

(22) Filed: Mar. 7, 2016

(65) Prior Publication Data
US 2017/0255279 A1 Sep. 7, 2017

(51) Int. Cl.
*G06F 3/033* (2013.01)
*G09G 5/08* (2006.01)
(Continued)

(52) U.S. Cl.
CPC ............ *G06F 3/0338* (2013.01); *A63F 13/22* (2014.09); *A63F 13/42* (2014.09); *G05G 9/047* (2013.01); *G06F 3/038* (2013.01); *G06F 3/0383* (2013.01)

(58) Field of Classification Search
CPC .......... A63F 13/20; A63F 13/23; A63F 13/24; A63F 13/98; A63F 13/00
See application file for complete search history.

(56) References Cited

U.S. PATENT DOCUMENTS 5,724,068 A * 3/1998 Sanchez ................. G05G 9/047
 345/161
5,963,196 A 10/1999 Nishiumi et al.
(Continued)

FOREIGN PATENT DOCUMENTS

EP 0761268 A2 3/1997
JP H07210312 A 8/1995
(Continued)

OTHER PUBLICATIONS

Lienhard, Samantha, "You Can Now Alter The Gta V Shooting "Deadzone"", Published on: Dec. 19, 2014 Available at: http://www.gta5cheats.com/can-now-alter-gta-v-shooting-deadzone/.
(Continued)

*Primary Examiner* — Insa Sadio

(57) ABSTRACT

User input devices, such as gaming controllers, are provided herein. In one example, a user input device includes a control stick mechanism configured to receive user manipulation in one or more axes. The user input device includes control circuitry configured to process movement data representative of the user manipulation to determine mapped movement data over a normalized movement space according to at least one of a mechanical center associated with the control stick mechanism and cardinality data defining a measured movement space associated with the control stick mechanism. The control circuitry is configured to present the mapped movement data for use in controlling one or more user interface elements with the control stick mechanism.

19 Claims, 8 Drawing Sheets

(51) Int. Cl.
  *G06F 3/0338* (2013.01)
  *G05G 9/047* (2006.01)
  *A63F 13/42* (2014.01)
  *A63F 13/22* (2014.01)
  *G06F 3/038* (2013.01)

(56) References Cited

U.S. PATENT DOCUMENTS

| | | | |
|---|---|---|---|
| 6,203,432 B1 | 3/2001 | Roberts et al. | |
| 8,050,891 B2 | 11/2011 | Podoloff et al. | |
| 8,133,119 B2 | 3/2012 | Finocchio | |
| 8,264,458 B2 | 9/2012 | Cooper et al. | |
| 9,170,658 B2 | 10/2015 | Quek | |
| 2004/0222965 A1 | 11/2004 | Riccomini et al. | |
| 2013/0100021 A1 | 4/2013 | Larsen et al. | |
| 2014/0083833 A1 | 3/2014 | Desplaines et al. | |
| 2014/0206428 A1* | 7/2014 | Thompson | G07F 17/3204 463/20 |

FOREIGN PATENT DOCUMENTS

| | | |
|---|---|---|
| JP | 2001228968 A | 8/2001 |
| WO | 9952614 A1 | 10/1999 |
| WO | 0165329 A1 | 9/2001 |

OTHER PUBLICATIONS

"Controller Dead Zones and Precision Aiming", Published on: Mar. 5, 2015 Available at: http://battlelog.battlefield.com/bf4/forum/threadview/2955064789956071189/.

"Getting Started With XInput", Published on: Oct. 5, 2011 Available at: https://msdn.microsoft.com/en-us/library/windows/desktop/ee417001(v=vs.85).aspx.

Sutphin, Josh, "Doing Thumbstick Dead Zones Right", Published on: Apr. 16, 2013 Available at: http://www.gamasutra.com/blogs/JoshSutphin/20130416/190541/Doing_Thumbstick_Dead_Zones_Right.php.

"How to Calibrate Your Xbox 360 Controller for a Windows-Based Computer", Published on: Mar. 18, 2013 Available at: https://support.xbox.com/en-us/xbox-360/accessories/calibrate-controller-for-windows-pc.

"Nintendo GameCube Accessory Troubleshooting", Published on: Sep. 19, 2002 Available at: http://www.nintendo.com/consumer/systems/nintendogamecube/trouble_accessory.jsp.

"International Search Report and Written Opinion Issued in PCT Application No. PCT/US2017/019798", dated Oct. 19, 2017, 21 Pages.

"International Search Report and Written Opinion Issued in PCT Application No. PCT/US2017/019797", dated Jun. 12, 2017, 10 Pages.

* cited by examiner

MOVEMENT SPACE MAPPING FOR CONTROL STICKS IN USER INPUT DEVICES

BACKGROUND

User input devices, such as gaming controllers, can include various proportional and analog-type controls, such as joysticks, thumbsticks, control sticks, proportional triggers, or other input mechanisms. These input mechanisms typically include both mechanical and electrical elements to allow for user manipulation in one or more directional axes. The user input devices can be employed in various interactive systems, such as discrete gaming consoles, computer gaming environments, portable gaming systems, and other devices and systems, which might also include aviation, military, or industrial control systems. The Microsoft Xbox® family of gaming systems are examples which can employ these user input devices, with a base system, set top box, or console configured to communicate with gaming controllers over wired or wireless interfaces. In operation, control sticks typically return to a mechanical resting position when a user is not engaging the control stick. Many gaining systems employ central 'dead zones' which ignore user input when a control stick is within the dead zone.

OVERVIEW

Systems, apparatuses, platforms, and methods that employ control stick user interface devices are provided herein, such as gaming controllers and other input devices with analog stick or analog/proportional trigger inputs. In one example, a user input device includes a control stick mechanism configured to receive user manipulation in one or more axes. The user input device includes control circuitry configured to process movement data representative of the user manipulation to determine mapped movement data over a normalized movement space according to at least one of a mechanical center associated with the control stick mechanism and cardinality data defining a measured movement space associated with the control stick mechanism. The control circuitry is configured to present the mapped movement data for use in controlling one or more user interface elements with the control stick mechanism.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

User input devices, such as gaming controllers, can include control stick mechanisms to allow a user to interact with on-screen elements. The user input devices can be employed in various interactive systems, such as discrete gaming consoles, computer gaming environments, portable gaming systems, and other devices and systems. Many types of gaming systems can employ these user input devices, with a base system, set top box, or console configured to communicate with gaming controllers over wired or wireless interfaces. In further examples, control stick mechanisms are employed in automotive, aviation, military, or industrial control settings.

Electromechanical elements included in the control stick mechanisms can be difficult to manufacture in a precise and repeatable manner, and mechanical elements used for the control stick mechanisms can have limited precision for tracking user input manipulation. One example control stick variety is a thumbstick which allows for user manipulation using a finger/thumb. When a user is not engaging the thumbstick, the thumbstick can responsively return to a central resting position using springs, bands, motors, servos, or other return elements. This resting position can vary over time within a device or from device-to-device depending upon manufacturing variability, component variation, wear levels of components, and other factors.

Many gaming systems have employed large 'dead zones' which ignore user input when a control stick is within the dead zone to account for variability in precision and alignment. In particular, two types of dead zones are typically applied: one dead zone type at the center of the control stick input space and one dead zone type at the perimeter of the control stick input space. When a central dead zone is not employed or not sized properly, a user application, such as a game, might interpret a resting position that a control stick returns to as an input signal in some direction. This can result in unwanted behavior of the user interface elements, such as a game character continuously moving or turning when the user is not engaging the control stick. Likewise, when a perimeter dead zone is not employed or not sized properly, a user application might interpret user activation of the control stick to the perimeter as a displacement less than a maximum possible input displacement, resulting in slower than desired movement or turning. However, these dead zones prevent use of the full range of motion for control sticks and can lead to undesirable control of in-game elements. The examples discussed herein do not require a large dead zone to compensate for these variabilities and inaccuracies, and instead provide for a dynamically calibrated user input device that enhances user interaction with gaming consoles or other associated systems. In many examples, a dead zone can be greatly reduced in size or even eliminated from use.

Figure 1:
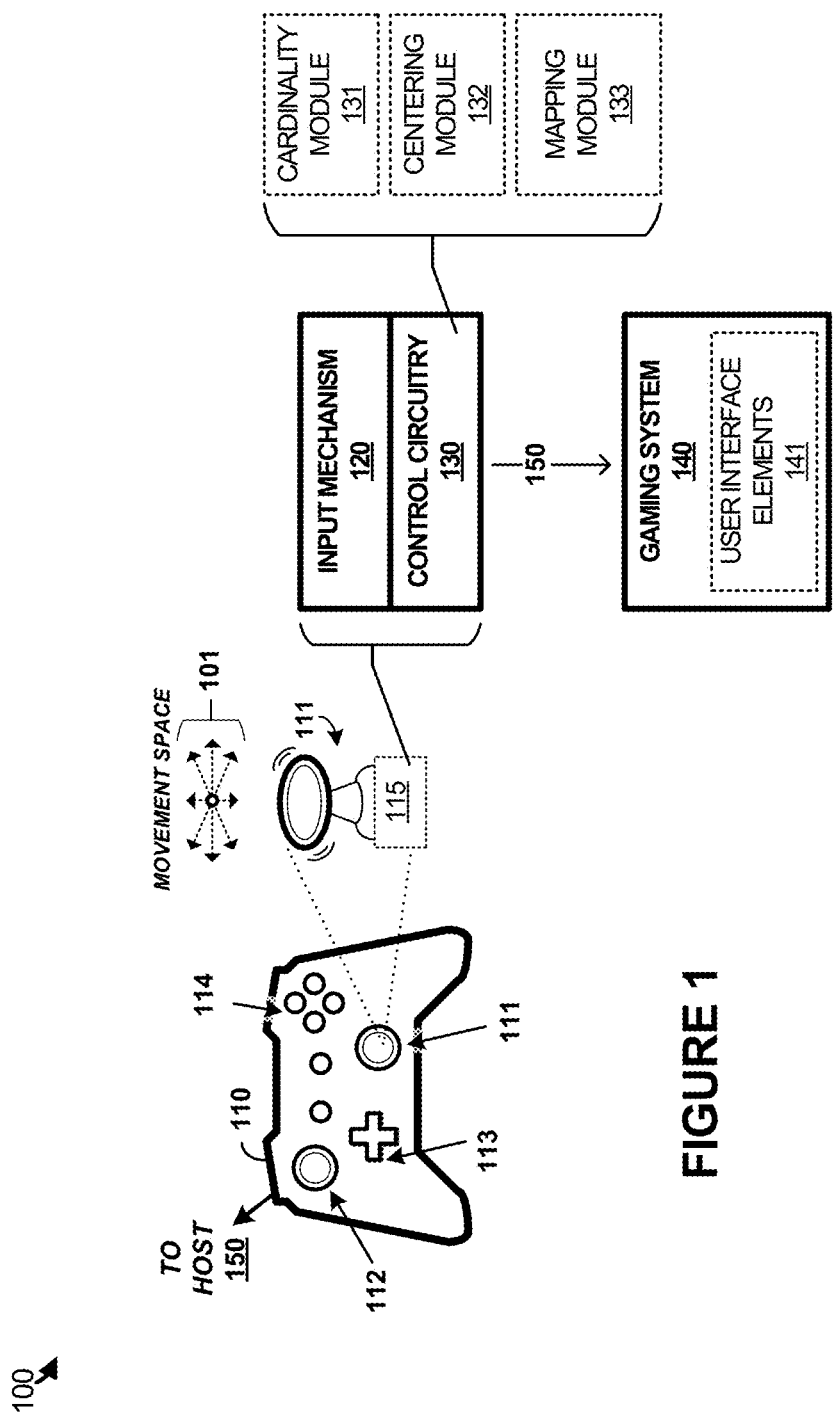
FIG. 1 is a system diagram of a user input environment in an implementation.

As a first example of a user interface device or user input device, FIG. 1 is presented. FIG. 1 is a system diagram illustrating user input environment 100. Environment 100 includes gaming controller 110 and gaming system 140. Gaming controller 110 and gaming system 140 communicate over one or more links 150. Links 150 can comprise wireless or wired links, and are discussed in further detail below.

In operation, a user will employ gaming controller 110 to interact with gaming system 140 using one or more input mechanisms, such as control sticks 111-112, directional pad (d-pad) 113, and buttons 114. Further input mechanisms can be employed, such as triggers, voice controls, touchpads, touchscreens, or other input mechanisms, including combinations thereof. Control circuitry 130 and associated modules can be employed to determine dynamically calibrated movement data and provide this dynamically calibrated movement data to a gaming system or other external system. In other examples, one or more of cardinality module 131, centering module 132, and scaling module 133 may be employed on gaming system 140, and control circuitry 130 can transfer unprocessed (i.e. raw) or partially-processed movement data over link 150 for determination of the dynamically calibrated movement data by gaming system 140. Other combinations of elements of gaming controller 110 and gaming system 140 can perform the operations discussed herein.

A detailed view of one control stick is shown in FIG. 1, namely for control stick 111. Control stick 111 includes a thumb stick portion for interfacing with a finger or thumb of a user over one or more axes that define movement space 101. Control stick 111 is a part of control stick system 115 that further comprises input mechanism 120 and control circuitry 130. Control circuitry 130 can comprise one or more control modules, namely cardinality module 131, centering module 132, and scaling module 133.

Input mechanism 120 includes one or more mechanisms which receive and respond to user manipulation of control stick 111. These mechanisms can include electromechanical elements, tension elements, spring elements, servo elements, motor elements, as well as structural elements which support and position control stick 111 with respect to measurement elements. Measurement elements, such as position sensing elements and transducer elements, can be included in control circuitry 130 and can comprise potentiometers, position determination circuitry, angular resolvers, optoelectronic position sensors, magnetic sensors such as Hall effect sensors or magnetoresistive sensors, encoders, capacitive sensors, inductive sensors, or other position measurement elements and position sensing elements. Analog-to-digital (A/D) conversion elements can also be included in control circuitry to translate analog measurement or positioning signals into digital movement data. These digital representations can be introduced to processing elements of control circuitry 130 for transfer over link 150 to gaming system 140 and control of user interface elements 141. However, as discussed herein, various dynamic calibration elements are included which can alter the digital representations to provide more accurate and precise control of user interface elements 141. Specifically, cardinality module 131, centering module 132, and scaling module 133 are employed in control circuitry 130.

Control circuitry 130 can comprise one or more microcontrollers, microprocessors, application-specific integrated circuits (ASICs), field-programmable gate arrays (FPGA), or discrete logic and associated circuitry, including combinations thereof. Control circuitry 130 can include, or be paired with, one or more analog-to-digital conversion elements to receive user input associated with controller 110 and input mechanisms 120. Further examples of control circuitry 130 are illustrated in input platform of FIG. 8.

Advantageously, the enhanced user input device elements and calibration processes discussed herein provide for more accurate user input control of user interface elements in gaming systems, or other systems discussed herein. The use of a dead zone or other associated unresponsive zone is reduced or eliminated using the processes discussed herein. These improvements to input device control and calibration have the technical effect of increasing accuracy and precision of user input devices, affording greater control of on-screen elements in gaming systems or associated mechanisms in automotive, industrial, or aviation systems as well as increasing the usable range of thumbstick motion.

Figure 2:
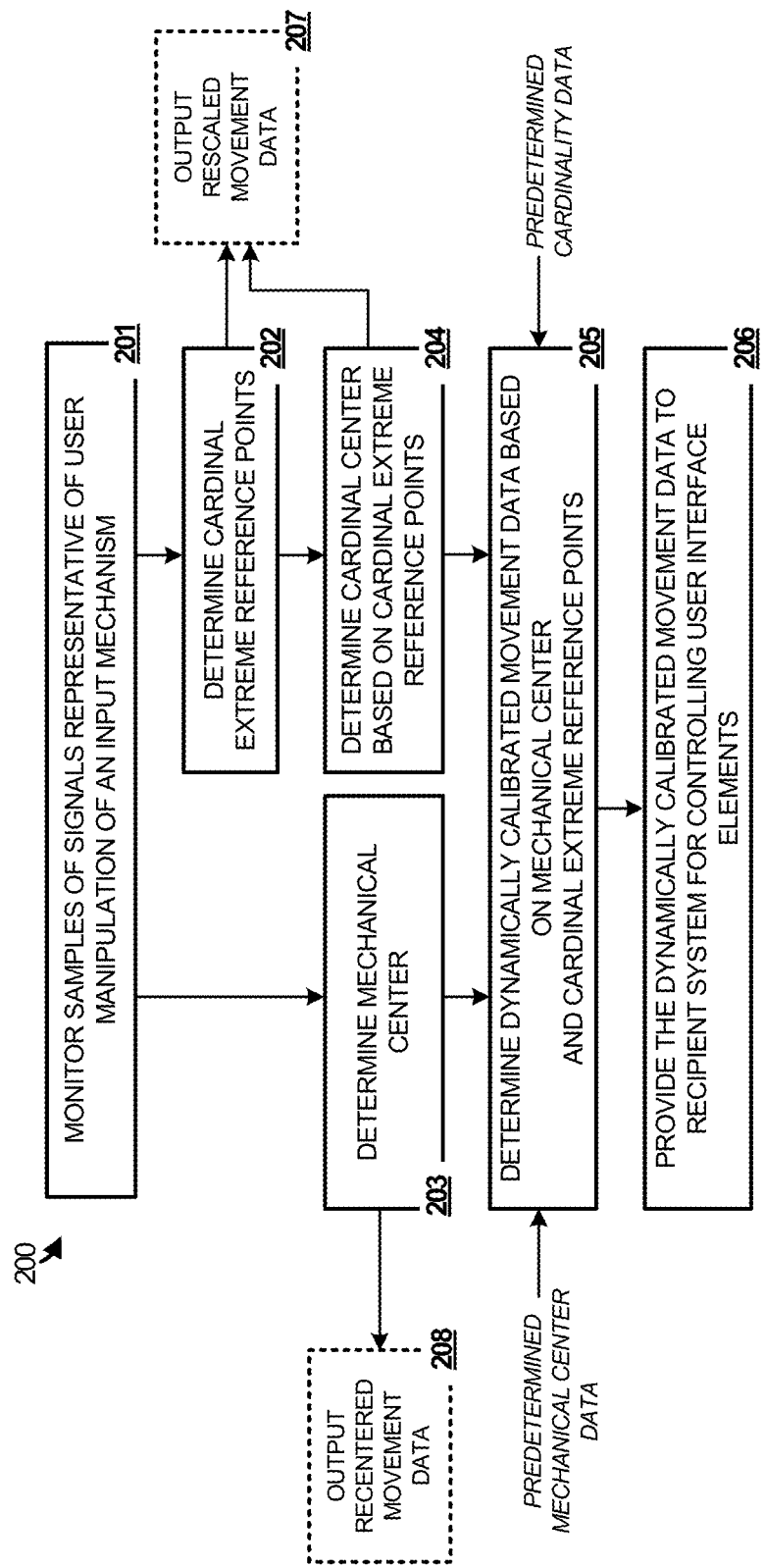
FIG. 2 illustrates a method of operating a user input device in an implementation.

FIG. 2 is a flow diagram illustrating a method of operation of controller 110 in environment 100. The operations of FIG. 2 are referenced parenthetically below. In FIG. 2, control circuitry 130 monitors (201) movement signals representative of user manipulation of input mechanism 120. Specifically, control circuitry 130 can monitor movement data samples related to control stick 111 (or any user interface element in controller 110). Movement data samples can comprise digital representations of position or movement of control stick 111 through movement space 101. In some examples, control circuitry 130 converts analog movement or position signaling into digital signaling and monitors the digital signaling, while in other examples input mechanism 120 can output digital signals representative of movement of control stick 111 to control circuitry 130.

During operation, new samples of the movement data are captured and applied using one or more functions to existing samples, populations of existing samples, or existing sequences of samples to determine new values of the various calibration data, such as for cardinal extremes reference points, center points, qualification zone data, or other calibration data. In some examples, a set or sequence of samples of the movement data are maintained by control circuitry 130, which can be included in a data structure comprising positional data samples. The samples can comprise positional data for control stick 111 determined periodically, such as every 'n' number of milliseconds. The set can include a predetermined number of samples, such as the last 'm' number of samples taken. A rolling window of samples can be established to replace the oldest members of the set with new samples. This rolling window can be advanced for each power cycle of controller 110, each usage session of controller 110, or continually over a fixed number of samples. The number of samples in the set can vary, but might be 1000 samples in one example. In thumbstick examples, a two-dimensional (2D) data set can be maintained, which cover movement space 101. In proportional trigger examples, a one-dimensional (1D) data set or single-axis movement space can instead be employed. In further examples, three-dimensional (3D) data sets can be maintained for 3D control input devices.

Measured data samples as monitored by control circuitry 130 can be processed to determine (202) cardinal extreme reference points for each cardinal direction of control stick 111. Each cardinal extreme reference point indicates a dynamically determined maximum value for a movement space of control stick 111 in a particular cardinal direction. Although cardinal directions might include any arbitrary axes or orthogonal directions, cardinal directions in the examples herein include up, down, left, and right for a 2D movement space. Cardinal extreme reference points can be derived from sequences of samples of qualified transit extremes or qualified maximum excursions of control stick 111. Maximum excursions are the most extreme movement samples in an associated cardinal direction. The cardinal extreme reference points can change over time due to mechanical variations in the input mechanism 120, among other usage variations. The qualified maximum excursions for each of the axes can change accordingly, and cardinal extreme reference points can be updated whenever new qualified maximum excursions occur.

Qualification of maximum excursions can include various processes. For example, movement of control stick 111 might need to occur within a cardinal extreme qualification zone to have an associated maximum excursion be considered as qualified. Only one qualified maximum excursion might be derived from each qualified transit through the associated qualification zone. These cardinal extreme qualification zones are discussed in more detail below in FIG. 3.

In some examples, the qualification can consider a state of a button integrated into the control stick, and only consider positional data samples or excursions that occur when an integrated button is not being pushed or pressed by a user. Other qualifications can occur, such as qualification windows or zones which prevent consideration of positional data that appears to be spurious or erroneous due to lying outside a statistically relevant perimeter around an existing cardinal extreme reference point, such as a 3 sigma perimeter, among others. Time thresholds can be applied where transits must persist in the associated qualification zone for a period of time greater than a threshold time for an associated maximum excursion to be qualified.

Figure 4:
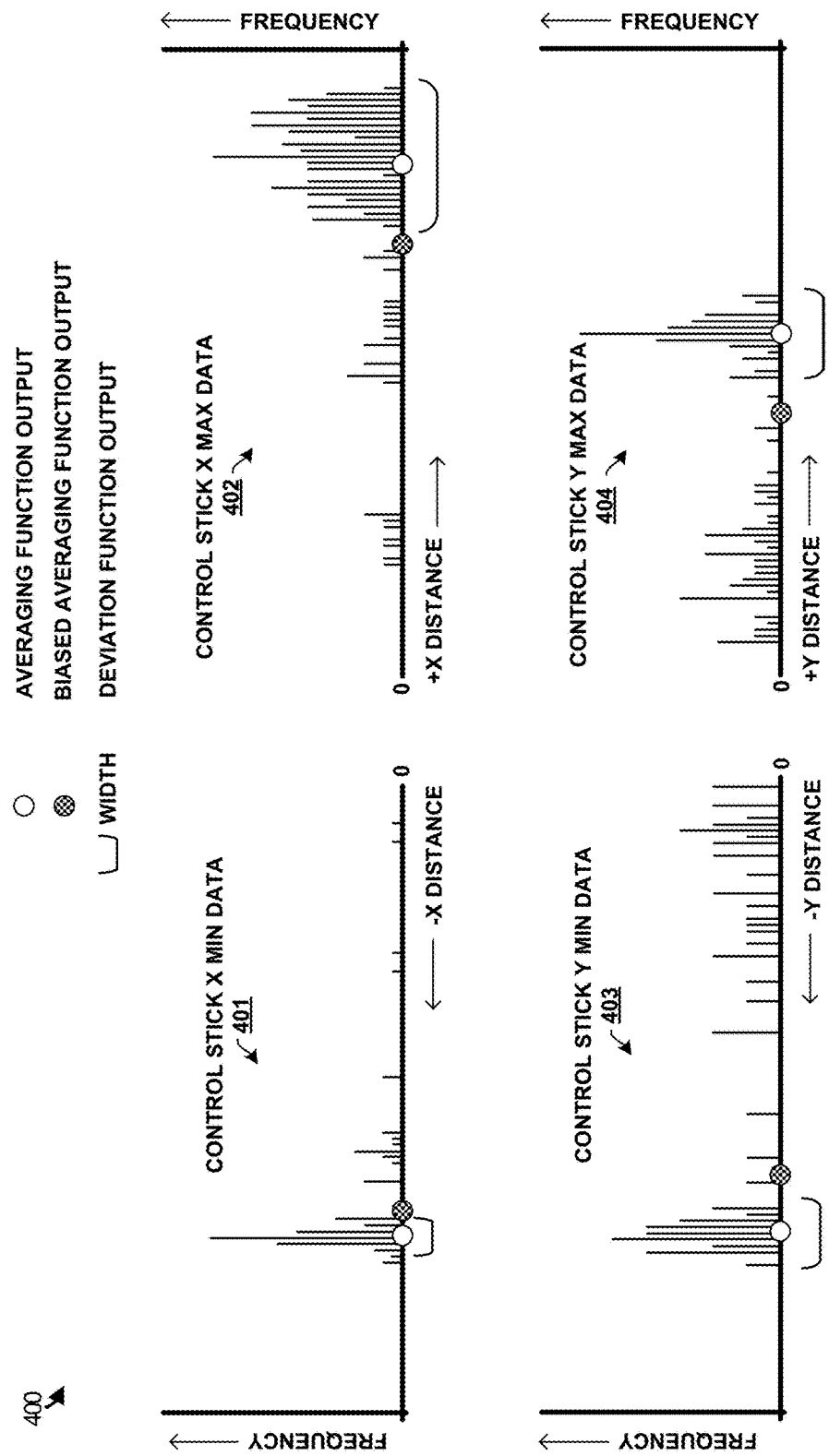
FIG. 4 illustrates user input device calibration data in an implementation.

In FIG. 1, cardinality module 131 can be employed to determine the cardinal extreme reference points. Measured movement data for control stick 111 can be represented as positional data samples, such as coordinates within a movement space. Cardinality module 131 can process these samples, as discussed above, to identify qualified maximum excursions for control stick 111 in each cardinal direction. Cardinal extreme reference points can be determined based on a function of the qualified maximum excursions of the control stick input mechanism for each of the one or more axes. One particular example is shown in FIG. 4 using histograms of measurement data that lie within these extreme zones. The histograms of FIG. 4 each show peaks and distributions of positional data for each of the axes are shown in FIG. 4 along with example functions that can process this data for each cardinal extreme qualification zone to output a cardinal extreme reference point. Other examples than those illustrated in FIG. 4 are discussed below.

In some examples, the cardinal extreme reference points can be used to rescale measurement data for control stick 111. This rescaled measurement data can be output (207) to an external system, such as gaming system 140, or can be employed by any user application, gaming environment, or other system which employs user input from controller 110. The output data can be scaled to fit a normalized movement space, such as described below in FIG. 5. For example, a raw as-measured measurement space can have associated cardinal extreme reference points determined and have the raw measurement space scaled to fit a normalized measurement space so the cardinal extreme reference points lie at a perimeter of the normalized measurement space. Further examples use other customized shapes which exceed the normalized measurement space slightly for enhanced usability of movement space. Further details are discussed below in FIG. 5. An optional cardinal center can also be determined based on the cardinal extreme reference points and this cardinal center can be used for centering of the raw measurement space to align with a midpoint center of the normalized movement space. The cardinal center can also be processed with the mechanical center in operation 203 to further calibrate measurement data.

As mentioned above, control circuitry 130 can determine (204) the cardinal center based on the cardinal extreme reference points. In FIG. 1, cardinality module 131 can be employed to determine the cardinal center. The cardinal center can comprise a median point between the cardinal extreme reference points. For example, when a 2D movement space is employed, each of the cardinal extreme reference points indicates a maximum excursion along each of the two axes (x and y axes) in the up, down, left, and right directions. A cardinal center point can be determined from these cardinal extreme reference points by taking a midpoint along each axis. Specifically, a cardinal center point comprises a point half way between x-axis minimum and maximum values and y-axis minimum and maximum values.

Control circuitry 130 determines (203) a mechanical center of control stick 111 derived from a sequence of rest actions. The mechanical center can be derived from a sequence of qualified resting points using an averaging function, with the qualification of resting points discussed below. In FIG. 1, centering module 132 can determine the mechanical center of control stick 111. The mechanical center can comprise a function applied to points where control stick 111 naturally comes to rest when un-manipulated by a user. Each time a user releases control stick 111, the associated input mechanism comes to rest near a center of the mechanism. Each rest action can produce a different physical resting position of control stick 111 due to variations in mechanical tolerances, static friction, dynamic friction, mechanical hysteresis, and precision limitations of associated input mechanisms. The mechanical center discussed herein comprises a value derived from applying one or more functions and qualifications to a plurality of measured resting points associated with control stick 111. The mechanical center is derived from measured data, which is a dynamically determined indication of a physical resting position or series of physical resting positions of control stick 111. An averaging function can be applied to a sequence of samples produced from a sequence of rest actions to derive a mechanical center. Thus, many resting points are processed to determine a mechanical center. The averaging function can include a mean, average, weighted moving average, or other statistical functions applied to determine a mechanical center from a sequence of resting points produced from a sequence of rest actions.

Various techniques may be used to determine when control stick 111 has come to rest which indicates a rest action. These techniques can qualify a rest action when control stick 111 moves to a natural mechanical return position and when control stick 111 is not actively engaged by a user, with consideration for spurious movement data. For example, a rest action may be indicated when control stick 111 stays within a predetermined sub-range of a full displacement on each axis for a predetermined amount of time. In a specific example, a rest action may be indicated when control stick 111 stays within 0.1% of a full displacement for 1 second. In a further example, a rest action is indicated when, for each axis, the maximum sampled value minus the minimum sampled value of a predetermined number of preceding samples is less than a predetermined threshold. In yet a further example, a rest action is indicated when, over a predetermined number of samples, the sum of all the absolute values of the differences for each axis or the distance in both axes between each sample and the sample before it is less than a predetermined threshold. In a further example, a rest action is indicated when, for each axis over a predetermined number of samples, the mean absolute deviation or median absolute deviation, or standard deviation is less than a predetermined threshold. In the preceding examples, each axis may share the same threshold, have different thresholds, or have a common threshold that is some function of the values on each axis.

Ranges can be employed for indication of rest actions. For example, a rest action can be indicated when control stick 111 stays within a predetermined range of a point or function for a required number of samples. This point or function may be an arbitrary previous sample or some suitable averaging function of recent samples. This range may be square or rectangular in shape or may take on another suitable shape such as a circle or ellipse. Thresholds or ranges used to indicate a rest action as described herein may be fixed or may be a function of duration/number of samples. For example, a higher range may indicate a rest action after a longer duration, or a shorter duration may indicate a rest action if the range is small.

When a rest event is indicated, a resting point may be selected that represents the point at which control stick 111 came to rest. This resting point may be the first point sampled once control stick 111 comes to rest, the last point sampled before control stick 111 begins movement after rest, some other point sampled while control stick 111 is at rest, an averaging function of the sequence of points at which control stick 111 is at rest, the midpoint of the range control stick 111 takes on while at rest, or any other representative point.

As referred to herein, an averaging function is a function of the previous samples that adequately represents a population of samples, which can be optionally weighted towards more recent data points and/or some original factory calibration. An averaging function can be selected based on available processing resources (such as RAM, persistent storage, compute cycles, hardware-implemented operations, or code space). Some averaging functions include a mean function, a midpoint of the max and min, a median function, the mode of all previous data points, or a "rolling" version of any of the preceding applied only to some arbitrary number of most recent points. Other examples of averaging functions include an infinite impulse response (HR) filter, a finite impulse response (FIR) filter, or a low pass filter. For example, an IIR filter $y_{n+1} = w \cdot x_{n+1} + (1-w) \cdot y_n$ where $0 < w \leq 1$ is the weight of each new point (e.g., w=0.05) may be an averaging function selected for low processing resource applications. If an extensive factory calibration is performed, a constant weight might be employed. Alternatively, if minimal or no factory calibration is performed, an averaging function might be selected to have a decaying weight for a predetermined number of data points after which the weight remains constant.

To further determine an accurate mechanical center, control circuitry 130 can establish one or more center qualification zones which each comprise a boundary around a distribution of resting points. These center qualification zones can be fixed in size/location or dynamic in size/location. When fixed in size, a center qualification zone can be centered on a predetermined location, such as a midpoint center of a measurement space, a midpoint center of a movement space, or a cardinal center, and have a size that is fixed at predetermined dimensions. When dynamic in size, the center qualification zone size can change over time as a distribution of resting points change due to additional measured samples. Resting points can be considered invalid if not occurring within a center qualification zone, and movement of the control stick can be used to further qualify resting points. For example, movement of control stick 111 might be required to first exit the center qualification zone and re-enter before qualifying as a resting point. Time thresholds can be employed to qualify resting points as well, such as where a control stick must stop moving within a certain time of entry into a center qualification zone, or a control stick must linger for a threshold amount of time in the center qualification zone. Further examples are discussed below for FIG. 3. A second center qualification zone can be employed, such as in FIG. 3, to provide a cross-check on a sizing of a first center qualification zone, which can help to avoid instances where a first center qualification zone used to qualify resting points migrates to an undesirable size over time.

Control circuitry 130 can determine recentered movement data using the mechanical center determined in operation 203. To establish the recentered movement data, control circuitry 130 can shift movement data to place the mechanical center at a midpoint center of a normalized movement space. This recentered movement data is used for control of user interface activity and can be output (208) to an external system, such as gaming system 140, or can be employed by any user application, gaming environment, or other system which employs user input from controller 110.

Control circuitry 130 determines (205) dynamically calibrated movement data based at least on a mechanical center and cardinal extreme reference points. In some examples, predetermined mechanical center data or predetermined cardinality data (cardinal extreme reference points or a cardinal center) can be employed instead of the dynamically derived mechanical center data and cardinality data. This predetermined data can be determined during factory calibration or based upon fixed values. However, in the discussion below for operation 205, dynamically derived data will be discussed.

In FIG. 1, mapping module 133 can calibrate the movement data for output to gaming system 140. As a result of mechanical and electrical tolerances, wear, manufacturing variability, and other factors, the cardinal center and the mechanical center are usually not located at the same point. In some systems, a large dead zone is employed to compensate for a difference in mechanical center from a center of measurement data as well as to compensate for variability among controller hardware. A dead zone inhibits output of movement to an associated gaming system until a control stick has moved beyond the dead zone. However, this dead zone can lead to a large unusable region of the total movement space of a control stick and cause inconsistencies and inaccuracies at the boundary of the dead zone when entering and leaving the dead zone. In the examples herein, a dead zone can be reduced greatly or entirely eliminated using dynamic calibration that incorporates processing a sequence of samples to dynamically determine cardinal extremes, cardinal center points, and mechanical center variations.

Figure 5:
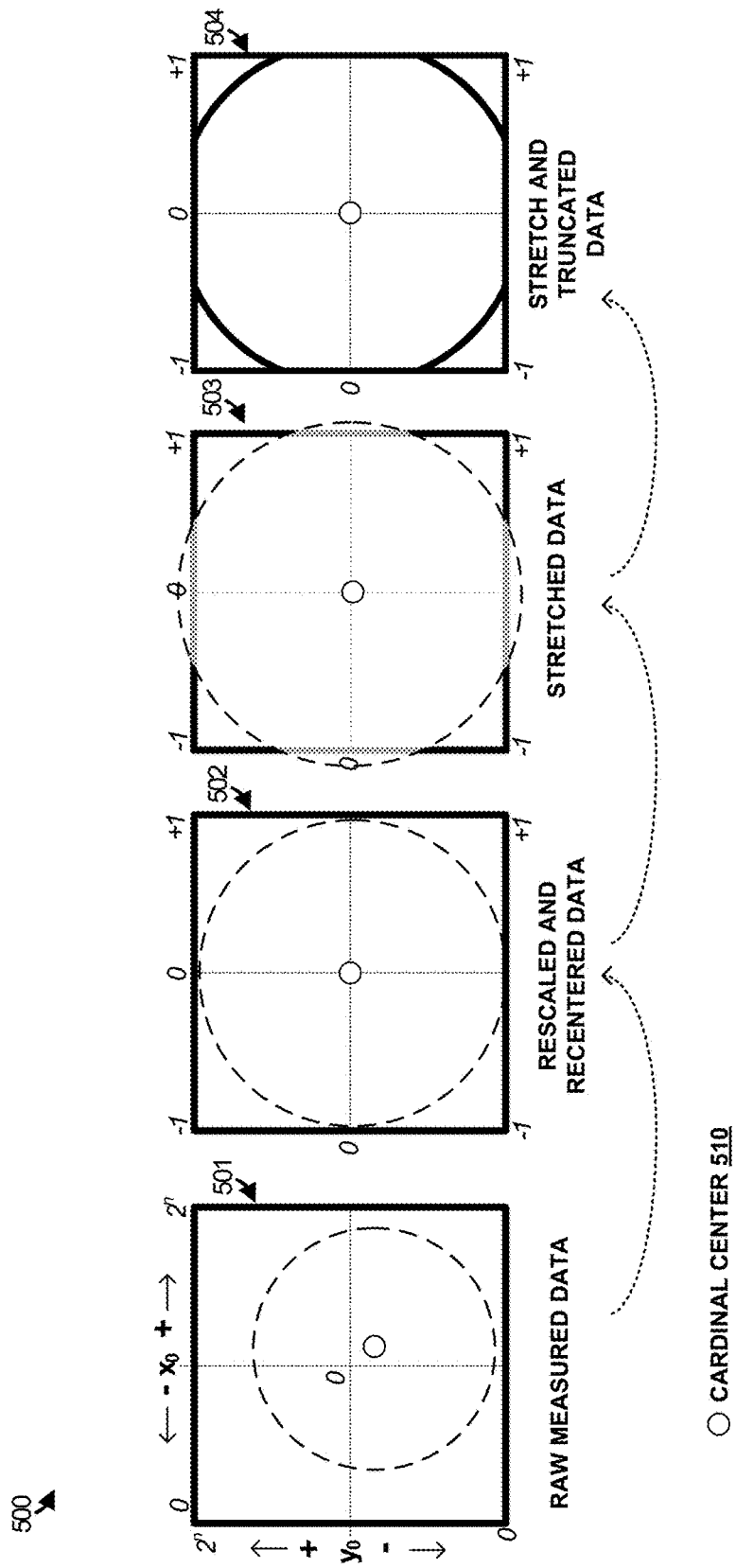
FIG. 5 illustrates user input device calibration data in an implementation.

To establish the dynamically calibrated movement data, control circuitry 130 first can rescale movement data so that the cardinal extreme reference points are positioned at a perimeter of a normalized movement space. A cardinal center, as defined by the cardinal extreme reference points, will also be positioned at a midpoint center of the normalized movement space when the cardinal extreme reference points are positioned at the perimeter of the normalized movement space. Control circuitry 130 scales the raw measurement data to fit the normalized movement space according to the cardinal extreme reference points. The normalized movement space can have predetermined min/max features comprising +/−1 (with (0,0) as a midpoint center), 0-to-$2^{16}$ bits, or other min/max limits. The scaling typically comprises stretching, compressing, or otherwise altering the measured movement space to fit the normalized movement space so that the cardinal extreme reference points are at a perimeter of the normalized movement space (or exceed a perimeter as seen in FIG. 5). The scaling can occur according to various scaling functions. In some examples, the scaling function is not uniform for the entire space, but can instead be performed on a half-axis basis (i.e. different scaling factor or function for each quadrant of the movement space). A further discussion of rescaling is included in FIGS. 5-7.

To establish the dynamically calibrated movement data, control circuitry 130 also maps the rescaled movement data over the normalized movement space to ensure the mechanical center is at the midpoint center of the normalized movement space while keeping the cardinal extreme reference points at desired locations about the perimeter of the normalized movement space. The mapping is discussed further in FIGS. 3-7, and can be performed according to various weighting functions to reduce distortion over the normalized movement space. Mapping will vary in a dynamic fashion as the mechanical center and the cardinal extreme reference points shift when new data points are sampled and processed or due to other attrition-based elimination. Each power-on session of controller 110 might prompt a capture of new maximum excursion data for each cardinal direction. Moreover, the size and shape of a qualification zone for mechanical center determinations can change according to a function applied to new samples of mechanical resting points.

The measurement data, such as resting points, maximum excursions, mechanical centers, qualification zone information, cardinal extreme points, and cardinal centers can be stored in non-volatile memory for use across multiple power cycles of controller 110. A shrinkage or attrition rate, such as 1%, can be applied to the distance of each cardinal extreme point from the cardinal center. A growth rate, such as 1%, can be applied to the size of the cardinal extreme qualification zones or resting point qualification zone to ensure new values are continually qualified to allow the measurement data to dynamically capture changes in mechanical behavior, among other changes. Each power-on can prompt calculation of mechanical centers, qualification zone information, cardinal extreme points, and cardinal centers, among other information. This information can then be used for mapping, centering, or scaling operations. Similarly, such shrinkage, growth, or recalculation may also occur periodically, such as every predetermined number of minutes, while controller 110 remains powered on or in operation.

Controller 110 then provides (206) the dynamically calibrated movement data to a recipient system for controlling user interface elements. The dynamically calibrated movement data can include movement data that is dynamically mapped according to recentering/rescaling operations, or can include just the mechanical center and cardinal extreme reference point data which is used by a recipient system for dynamic calibration. In FIG. 1, control circuitry 130 provides the dynamically calibrated movement data over link 150 for delivery to gaming system 140 for control of user interface elements 141. Gaming system 140 can include one or more user applications which allow a user to interact with on-screen elements provided by user interface elements 141 using controller 110. The user applications can include entertainment games, first-person shooters, strategy games, arcade-style games, productivity applications, social media applications, fitness applications, finance applications, media player applications, conferencing applications, or other applications, including combinations thereof.

Control system 130 can also report fault conditions to gaming system 140 or other systems over link 150. These fault conditions can include when dynamic calibration encounters errors, when mechanical tolerances exceed threshold levels, or other fault conditions. In one example fault condition, cardinal extreme calibration values are a threshold fraction less or more than previous cardinal extreme calibration values. This can indicate a problem with motion of an associated control stick, such as a range of motion constrained by debris or other failure of input mechanisms. A low level or high level cardinal extreme calibration value can be established which limits how much current cardinal extreme calibration values can shrink or grow to prevent malfunctioning devices from altering calibration data too severely. Other fault conditions can include when center points are not found, such as due to excessive noise or drift in the measurement data. A fallback to a cardinal center of a measurement space can be used when actual measured data fails to provide a mechanical center or vice versa. These fault conditions can be reported to a user via an associated gaming system or via one or more user interface elements of controller 110.

Figure 3:
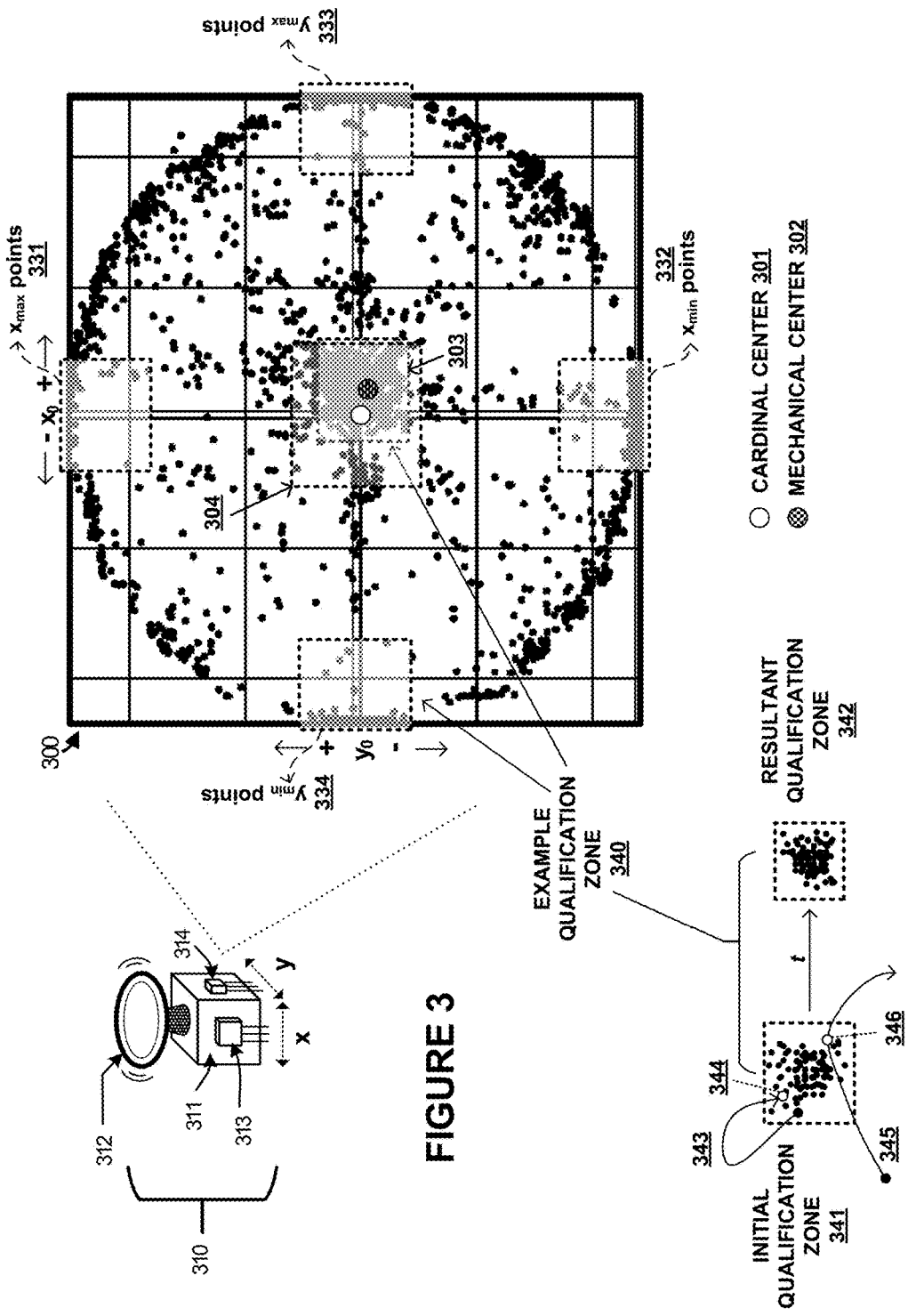
FIG. 3 is a system diagram of a user input device in an implementation.

To further illustrate dynamic calibration in a controller device, FIG. 3 is provided. FIG. 3 is a system diagram illustrating control stick 310, as an example of a user input device in an implementation. Control stick 310 can include elements found in controller 110 of FIG. 1, such as control sticks 111 or 112, although variations are possible. Control stick 310 includes mechanism 311, thumbstick 312, and position sensors 313-314. A two-dimensional map of sampled movement data for control stick 310 is shown in graph 300.

Turning first to the elements of control stick 310, mechanism can include one or more electromechanical elements which receive and respond to user manipulation of thumbstick 312. These mechanisms can include electromechanical elements, tension elements, spring elements, motor elements, servo elements, as well as structural elements which support and position thumbstick 312 with respect to measurement elements. Position sensors 313-314 can comprise potentiometers, position determination circuitry, angular resolvers, rotary encoders, optoelectronic position sensors, magnetic sensors such as Hall effect sensors or magnetoresistive sensors, encoders, capacitive sensors, inductive sensors, or other measurement elements and sensing elements. Analog-to-digital (A/D) conversion elements can also be include in position sensors 313-314 to translate analog measurement or positioning signals into digital movement data. These digital representations can be introduced to processing elements for transfer to gaming systems for control of user interface elements.

In operation, a user can manipulate thumbstick 312. A control system, such as that described in FIGS. 1 and 8, can monitor signals associated with the user manipulation of thumbstick 312 to determine dynamic calibration information. Graph 300 illustrates a representation of sampled data points for control stick 310 which arise from periodic sampling of movement data associated with control stick 310. This movement data is arranged in a two-dimensional graph with a axis relating to up and down movement of thumbstick 312, and a 'x' axis relating to left and right movement of thumbstick 312. A midpoint for each axis is indicated in the middle of graph 300.

Cardinal extreme qualification zones are zones configured to include the most extreme physical position reachable in each cardinal direction, as indicated by four regions in graph 300, namely $x_{max}$ qualification zone 331, $x_{min}$ qualification zone 332, $y_{max}$ qualification zone 333, and $y_{min}$ qualification zone 334. Motion of a control stick within these regions yields maximum excursions for the control stick. For example, a maximum excursion may be produced once per each entry/exit are thorough a qualification zone as the maximum value reached while within the qualification zone or according to an averaging function of a sequence of samples while within the qualification zone. A representative cardinal extreme reference point can be determined from the maximum excursions of each qualification zone. FIG. 4 illustrates one example process by which cardinal extreme reference points can be determined using averaging functions of the sequences of maximum excursions, and will be discussed below.

Cardinal extreme qualification zones such as $x_{max}$ qualification zone 331, $x_{min}$ qualification zone 332, $y_{max}$ qualification zone 333, and $y_{min}$ qualification zone 334 can be dynamically sized. In other examples, the cardinal extreme qualification zones can be of a fixed, predefined, or factory calibrated size. In particular, dynamically sized cardinal extreme qualification zones can be a multiple times a deviation function of the sequence of maximum excursions within that zone or according to a function of the deviation function of the sequence of maximum excursions within each zone. Cardinal extreme qualification zone positions can be referenced to a corresponding cardinal extreme point, the cardinal center, the mechanical center, or other suitable reference point. In other examples, the cardinal extreme qualification zone positions are fixed or predetermined. Although qualification zones 331-334 are shown as rectangular shapes, it should be understood that other shapes can instead be employed such as triangles, elliptical or semi-elliptical shapes, and trapezoids. The rectangles of qualification zones 331-334 can have infinite extent in the outward direction (i.e. the direction of the associated cardinal), but other suitable zones may have finite extent in the outward direction. In some examples, the inner boundary (towards the midpoint center) can be related to the mean cardinal extreme by a fixed value or a value derived from the distribution of qualified transit extremes around the value mean cardinal extreme at the time the qualified transit extreme was observed. The two side boundaries can be centered around the midpoint of the other cardinal axis. The outer boundary (away from the midpoint center) can be fixed, and may be derived from factory calibration data.

As mentioned above, cardinal extreme reference points can be derived from a sequence of qualified transit extremes using a weighted moving average. Qualified transit extremes are those that occur within cardinal extreme qualification zones 331-334. In the example shown in FIG. 3, one qualified transit extreme is derived from each qualified input transit through the cardinal extreme qualification zone, which can be the most extreme value observed during the transit through the cardinal extreme qualification zone. Example transit 345 includes most extreme value 346 in FIG. 3. One or more time thresholds can be established for the transits. A first time threshold includes when a transit must persist within the cardinal extreme qualification zone for a period of time greater than a certain threshold for the transit extreme to be qualified. If the input transit through the qualification zone contains any points that exceed the outer qualification zone boundary, the entire input transit can be ignored and not qualified in some examples.

Example qualification zone 340 in FIG. 3 shows initial qualification zone 341 established around a first distribution of maximum excursions. In this example, qualification zone 340 is for the $x_{max}$ cardinal direction, and similar concepts would apply in the other cardinal directions. Later, as the distribution changes due to new sampled maximum excursions, resultant qualification zone 342 can be established. Example motion 345 is shown in FIG. 3. In maximum excursion examples, motion 345 can illustrate thumbstick 312 arcing through qualification zone 341 by entering and then exiting qualification zone 341 to produce a maximum excursion 346. As can be seen, many samples of maximum excursions which occur over time are located within qualification zone 341, and indeed changes in new samples of maximum excursions can be used to establish resultant qualification zone 342.

The deviation functions mentioned above can be a function of the previous samples that represents the variation of the population optionally weighted towards more recent data points and/or original/factory calibration. Deviation functions can be selected based on available processing resources or desired processing load (e.g. RAM, persistent storage, compute cycles, hardware-implemented operations, and code space). Example deviation functions include standard deviation, mean or median deviation or distance (relative to an averaging function), a range of previous data points, or a "rolling" version of any of the preceding deviation functions applied only to some predetermined number of most recent points. Examples of averaging functions include an infinite impulse response (IIR) filter, a finite impulse response (FIR) filter, or a low pass filter of the deviation or distance of each data point from the output of an averaging function or mechanical center 302. For example, if the IIR filter $y_{n+1} = w \cdot x_{n+1} + (1-w) \cdot y_n$ where $0 \leq w \leq 1$ is the weight of each new point (e.g., w=0.05) is used for an averaging function, the IIR filter $z = n+1 = w \cdot |x_{n+1} - y_{n+1}| + (1-w) \cdot z_n$ may be a well-suited deviation function for low processing resource applications.

Advantageously, the cardinal extreme determination processes lead to accurate localization of cardinal extreme reference points using one or more functions of the sequence of qualified transit extremes. When cardinal extreme reference points are set too low (such as too close to the center of the measurement space), mechanical travel in a control stick is wasted. Conversely, when cardinal extreme reference points are set too high (such as too far from the center of the measurement space), the control stick might not be as responsive as in a properly determined cardinal extreme reference point example. Moreover, when cardinal extreme reference points are set too high, then a full range of control by the control stick might not be available to a user because the normalized movement space does not reach full scale when the control stick is at a maximum physical extent.

From the cardinal extreme reference points, cardinal center 301 can be established. This cardinal center is determined from a center point derived from the cardinal extreme reference points, namely a center point in each axis between the cardinal extreme reference points. Graph 300 is centered on cardinal center 301 in FIG. 3.

In further examples, an additional fault zone can be employed for each of the cardinal extreme qualification zones shown in FIG. 3. These fault zones can be established to detect when maximum excursions have migrated too far or too rapidly for an associated cardinal direction, and trigger appropriate action responsive to the faults. For example, if a main distribution of maximum excursions moves, then a mean center of the associated cardinal extreme qualification zone might be accordingly moved. However, if this main distribution moves into the fault zone, then a fault condition can occur. These fault zones can be advantageous when rapid shifts in maximum excursions might disrupt the dynamic processes discussed herein for determining appropriate cardinal extreme reference points. Slow migrations of the cardinal extreme qualification zones can occur due to changes in maximum excursions over time. However, when these changes in maximum excursions shift too quickly, then the fault zone can detect the shifts and alert a control system or operator of a fault condition, or take other action such as reverting to predetermined zone sizes or cardinal extreme reference points.

A mechanical center point is also determined, indicated by mechanical center 302 in FIG. 3. Each rest action of thumbstick 312 can produce a different resting position due to variations in mechanical tolerances, static friction, dynamic friction, mechanical hysteresis, and precision limitations of associated input mechanisms. An averaging function can be applied to a sequence of resting points to determine a mechanical center. Thus, many resting points are processed to determine a mechanical center.

In FIG. 3, center qualification zones 303 and 304 can be established and each comprises a boundary around a center point—center qualification zone 303 is centered on the current mechanical center and center qualification zone 304 is centered on the cardinal center, which can instead be a midpoint center of a normalized movement space when a normalized movement space is used. Center qualification zone 304 is fixed in size in this example, where the fixed size can be determined based on various factors, such as factory calibration data or a size input by a user or operator. Other examples can have center qualification zone 304 as dynamic in size, such as a multiple of the size of center qualification zone 303, among other dynamic sizes.

Center qualification zone 303 is dynamic and center qualification zone 303 size can change over time as new resting points are sampled. For example, example qualification zone 340 in FIG. 3 shows initial qualification zone 341 established around a first distribution of resting points. Later, as the distribution changes due to new measurement data samples, resultant qualification zone 342 can be established. In some examples, qualification zone 303 may be fixed in size, such as set to a predetermined size or established during a factory calibration. Although qualification zone 303 of FIG. 3 is shown as a rectangular shape, it should be understood that other shapes can instead be employed. A deviation function can be applied to a sequence of resting points to determine a size of qualification zone 303. Qualification zone 303 can have side lengths, elliptical radii, or other geometric parameters of some multiple of a deviation function for each axis or other function of a deviation function for each axis. Qualification zone 303 can have predetermined maximum and minimum sizes to force stability among qualification zone 303.

Center qualification zones 303 and 304 can be used to qualify resting points to allow invalid or spurious resting points to be ignored. Resting points can be considered invalid if not occurring within qualification zone 303. In some examples, the qualification can also consider a state of a button integrated into the control stick, and only consider positional data that occurs when an integrated button is not being pushed or pressed by a user. Movement actions of thumbstick 312 can be used to further qualify resting points. For example, movement of thumbstick 312 might be required to first exit the qualification zone or some other suitably sized zone and re-enter before qualifying as a resting point. Example motion 343 is shown in FIG. 3. In resting point examples, motion 343 can illustrate thumbstick 312 initially being at rest, moving outward and exiting qualification zone 341, then re-entering qualification zone 341 to come to rest at potential resting point 344. As can be seen, each resting point might be at a different location.

In FIG. 3, two center qualification zones are shown (303 and 304), although in some examples only a single center qualification zone 303 is employed. In FIG. 3, center qualification zone 303 is referred to as a primary center qualification zone and center qualification zone 304 is referred to as a secondary center qualification zone. As mentioned above, a mechanical center point can be derived from a sequence of qualified resting points using a weighted moving average. The resting points can be qualified that occur inside the primary center qualification zone and meet one or more timing thresholds. In a first time threshold, input movement must stop changing within a certain time of entering the center qualification zone. In a second time threshold, the input movement must change by no more than certain amounts for more than a certain time. In other words, a qualified rest action comprises movement data associated with control stick 312 indicating a change in the movement data less than a threshold distance for more than a threshold time. Other time thresholds can be applied, and combinations of the time thresholds can be included. In the example in FIG. 3, one resting point is qualified per center qualification zone entry, and the input movement must first exit the primary center qualification zone for a new resting point to be qualified, as seen with movement 343 for a single example center qualification zone.

Primary center qualification zone 303 is dynamic and comprises a rectangular shape with an adaptive size that is derived from the distribution of qualified resting points around the mechanical center. The distribution of qualified resting points can be calculated independently for each axis using a weighted moving average of the mean deviation, the standard deviation, or some other method of measuring distribution of data. In processing resource-limited examples, a mean deviation is preferred. Primary center qualification zone 303 is centered on the mechanical center, and secondary center qualification zone 304 can be fixed in size and centered on the midpoint center of space 300. FIG. 3 shows primary center qualification zone 303 sizing as adaptive/dynamic and secondary center qualification zone 304 as static. Other examples can have different configurations of static or dynamic sizing of the center qualification zones. Primary center qualification zone 303 size can also depend on the absolute difference between the mechanical center and a mean of secondary center qualification zone 304, the distribution of primary center qualification zone 303 qualified resting points (e.g. a predetermined quantity of mean deviations), and the distribution of secondary center qualification zone 304 qualified resting points (e.g. another predetermined quantity of mean deviations).

Optional secondary center qualification zone 304 can provide limits on a sizing of primary center qualification zone 303, which can help to avoid instances where primary center qualification zone 303, as used to qualify resting points, migrates to an undesirable size over time. Secondary center qualification zone 304 resting points can be qualified similarly to primary center qualification zone 303, but are not dependent on being within primary center qualification zone 303. Secondary center qualification zone 304 can provide a broader view when processing resting points. For example, if qualified resting points occur in secondary center qualification zone 304 that do not also occur within primary center qualification zone 303 then the size of primary center qualification zone 303 can be increased to include the more broadly occurring qualified resting points detected by the secondary center qualification zone 304. The time thresholds and input measurement change limits may be similar or different for secondary center qualification zone 304 than those used for primary center qualification zone 303. A mean function for secondary center qualification zone 304 can be derived from the sequence of qualified resting points using a weighted moving average. The distribution of secondary center qualification zone 304 resting points can be calculated independently for each axis using a weighted moving average of the mean deviation, the standard deviation, or some other method of measuring distribution of data. In processing resource-limited examples, a mean deviation is preferred.

Time thresholds can be employed to qualify potential resting points as resting points, such as where a control stick must stop moving within a certain time of entry into a resting point qualification zone, or a control stick must linger for a threshold amount of time in the resting point qualification zone. For example, a threshold can be established to indicate a maximum time threshold before control stick movement stops while in the qualification zone (or other suitable zone) to be qualified as a resting point. A time between entering a qualification zone (or other suitable zone) and coming to rest is related to a velocity of the control stick movement and placing threshold limits on this time can ensure the control stick was released with adequate velocity not guided back to center by a user. If associated time thresholds are met, then a potential resting point can be qualified as a resting point.

In further examples, a multi-part qualification can be established, where a resting point is only qualified as such when all conditions are met. These conditions can include a qualification zone exit-reentry conditions, only one resting point per entry into the qualification zone (or other suitable zone), time thresholds met, and an associated button on the control stick is not pressed.

Fault conditions can also be established for sizing the qualification zone for resting points and distributions of resting points. For example, when the qualification zone falls below a size minimum threshold or exceeds a size maximum threshold, a fault condition can be triggered. This fault condition can prevent the qualification zone from increasing in size beyond the maximum size threshold or decreasing in size below the minimum size threshold. Example thresholds can include 'no smaller than 5% of a full scale' or 'no larger than 25% of a full scale'—where the full scale might be a scale of the normalized measurement space. Other size thresholds can be used, and the preceding thresholds are merely exemplary.

FIG. 4 illustrates further examples 400 on determining cardinal extreme reference points or distributions of cardinal extreme reference points, such as $x_{max}$ points 331, $x_{min}$ points 332, $y_{max}$ points 333, and $y_{min}$ points 334 in FIG. 3. In histogram 401, control stick $x_{min}$ data is shown with a frequency of data points accumulated along the −x distance from an origin. In histogram 402, control stick $x_{max}$ data is shown with a frequency of data points accumulated along the +x distance from an origin. In histogram 403, control stick $y_{min}$ data is shown with a frequency of data points accumulated along the −y distance from an origin. In histogram 404, control stick $y_{max}$ data is shown with a frequency of data points accumulated along the +y distance from an origin.

Each histogram has a peak of data which indicates a potential location of a cardinal extreme reference point for each cardinal direction (e.g. +x, −x, +y, −y). This data peak can be identified by processing a sequence of maximum excursion points in that cardinal direction with an averaging function or biased averaging function biased towards the inside of the control stick input space. This bias serves to ensure a conservative cardinal extreme reference point that can consistently be reached when control stick 111 is brought to its maximum physical extent in a cardinal direction.

In some examples, the biased averaging function mentioned above can be a function of samples that represents the population of samples deliberately biased to one side of the distribution of the population and optionally weighted towards more recent samples and/or an original factory calibration. A biased averaging function can be selected based on available processing resources (e.g. RAM, persistent storage, compute cycles, hardware-implemented operations, or code space). Example biased averaging functions include a ratio between the min and max, a given percentile of all previous samples, some predetermined number of most recent samples, a biased or unbiased averaging function plus a fixed offset, a multiple of a deviation function, or function of a deviation function. For example, if the IIR filter $y_{n+1}+w \cdot x_{n+1}+(1-w) \cdot y_n$ where $0 < w \le 1$ is the weight of each new point (e.g., w=0.05) is used for an averaging function and the IIR filter $z_{n+1}=w \cdot |x_{n+1}-y_{n+1}|+(1-w) \cdot z_n$ is used for a deviation function, a suitable biasing function may be $y_{n+1}-z_{n+1}$ for +x and +y and $y_{n+1}+z_{n+1}$ for −x and −y.

FIG. 5 illustrates centering and scaling processes 500, as can be implemented by any of the example systems discussed herein. In graph 501, a perimeter is shown as encircling a raw measurement data set, such as a set of samples for movement data of a control stick as interpreted by an n-bit analog-to-digital (A/D) converter. A cardinal center 510 can be shown as a midpoint center of the movement data. In graph 501, this data does not extend to the borders of the entire measurement space such as the 0-2" outputted by an n-bit analog to digital converter, and the cardinal center is also not centered within the measured space. In graph 502, the measurement data has been recentered to have the cardinal center located at the midpoint center (0,0) of the normalized space. Also, the measurement data has been rescaled to fit the normalized space defined by the +1/−1 graph.

In graph 503, the scaled and centered measurement data has been further stretched to slightly exceed the normalized space, and finally in graph 504 the measurement data has been truncated at regions that lie outside the normalized space after stretching, creating a truncated circle. The truncation is performed to ensure a consistent extreme output (i.e. +1/−1) when a control stick is brought to its maximum physical extent in a cardinal direction. For example, in a user application, such as a game or other application that employs a user interface, a normalized space of movement might be employed by a controller device. However, the controller device might desire to err on the side of scaling too large for the normalized movement space to ensure full range of motion of an associated control stick portion. The truncated circle shape can provide this full range of motion while still being scaled to the normalized movement space. The truncated circle shape also accommodates variability in the cardinal extreme calibration values. Specific metrics for the truncated circle shape can be found in the following example: 'b' can be stablished as a percentage of stretching, and 'a' can be established as a percentage of a circle flattened. The equation $b=\sqrt{1+a^2}-1$ can be derived from $r(1+b)=\sqrt{r^2+(ar)^2}$. In one example, a preferred truncated circle shape is defined by a=0.33 which corresponds to stretching by b=0.054 or 5.4%.

Figure 6:
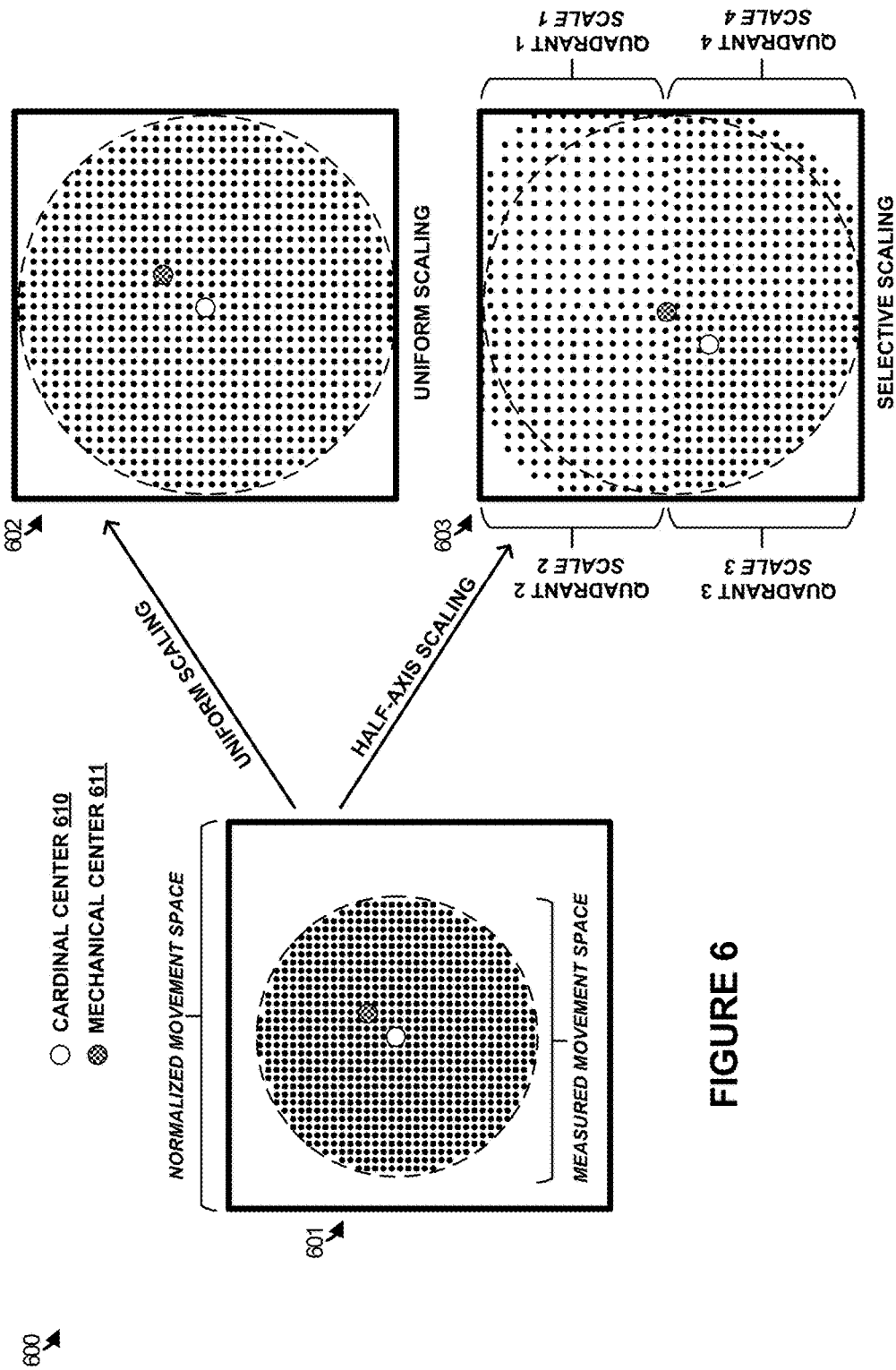
FIG. 6 illustrates user input device calibration data in an implementation.

FIG. 6 illustrates user input device calibration data 600 in an implementation. In FIG. 6, graph 601 illustrates a measured movement space which represents raw measurement data for a control stick before centering or scaling operations. Graph 601 also is sized to match a normalized movement space which is employed by an end system for movement of user interface elements, such as a game system or game interface for controlling on-screen elements. As can be seen in graph 601, the movement space as measured from an associated control stick mechanism does not utilize the entire normalized movement space, and this measured movement space can vary from device-to-device and over time for a single device. To enhance repeatability of user interface controls, the various centering, scaling, and mapping processes are employed herein.

Graph 602 illustrates a centered and scaled version of the measured movement data of graph 601. The cardinal center 610 is shifted to the midpoint of the normalized movement space, and this shift is applied to further measurement data to center the further movement data about the center of the normalized movement space. Also, a uniform scaling factor is applied which scales the measured movement space to fit the normalized movement space. However, as can be seen in graph 602, a mechanical center 611 is still not centered in the normalized movement space, meaning that mechanical center 611 may result in some output significantly different from a midpoint center of the normalized movement space. This difference might be compensated for using a center deadzone to avoid negative effects of too small of a center deadzone. Thus, although uniform scaling is less impactful from a processing perspective, the uniform scaling can lead to undesirable effects when a mechanical center differs from a cardinal center of the measurement data.

In graph 603, half-axis scaling is employed on the measured movement data, so that each quadrant of the normalized movement space has a different scaling factor applied thereto. As can be seen in graph 603, the mechanical center is now located in the center of the normalized movement space. A separate scaling factor is applied to each of the four quadrants to fit the measured movement data to the normalized movement space. The scaling factor can be positive or negative to expand or compress the associated quadrant data spaces. However, as can be seen in graph 603, the scaling can lead to non-uniformities across the entire movement space and periphery which can be noticeable to an end user during usage of an associated controller device. This can be especially pronounced at transition zones between scaling factors where rapid changes in scaling factor can lead to undesirable control artifacts and perceptibility of distortions at the scaling factor borders. Moreover, this half-axis scaling can lead to non-ideal behavior at the periphery of the measurement space.

Figure 7:
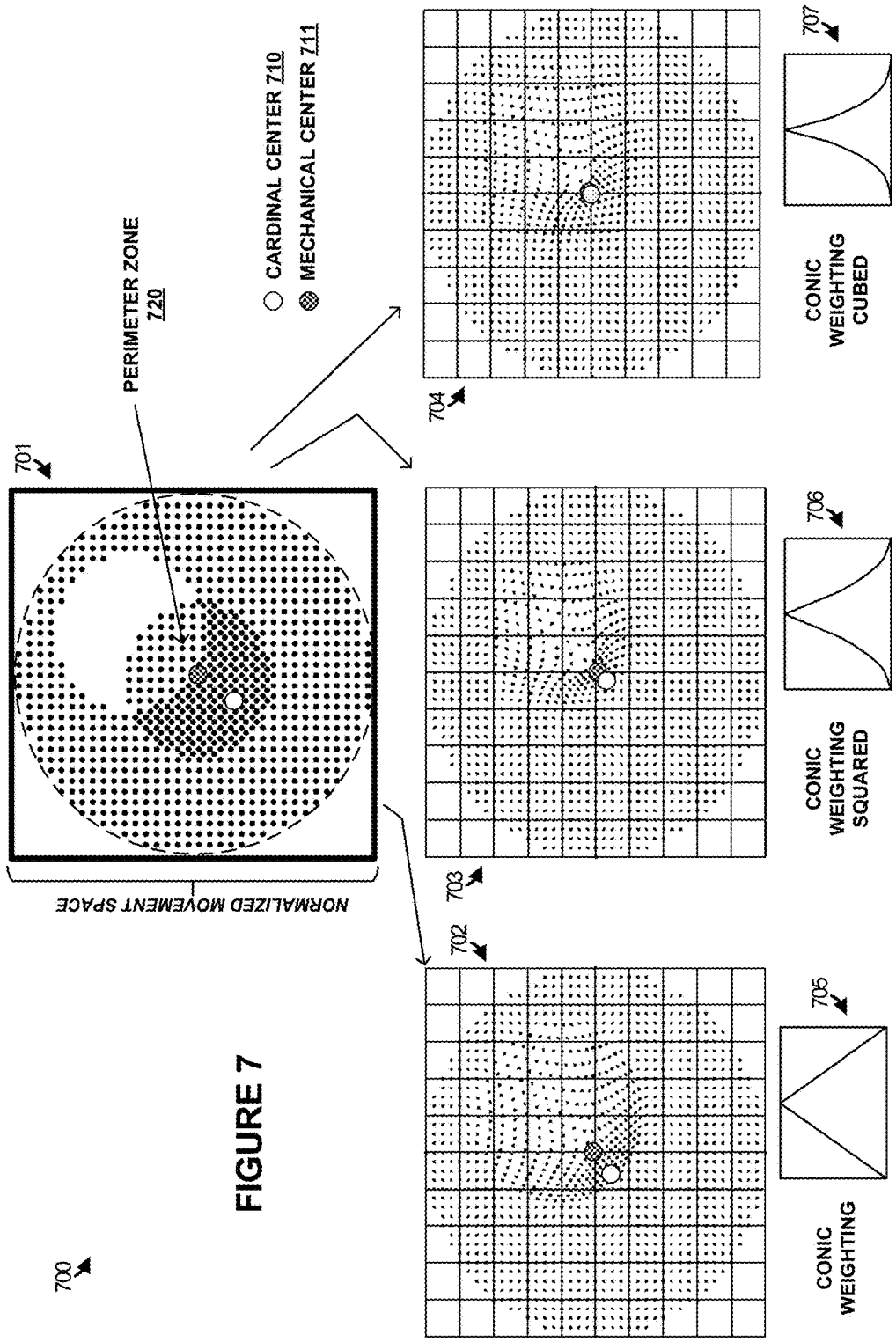
FIG. 7 illustrates user input device calibration data in an implementation.

FIG. 7 illustrates user input device calibration data in an implementation. Specifically, FIG. 7 illustrates advanced centering and scaling processes. In graph 701, a measured movement space has first been centered about a midpoint center in a normalized movement space and then scaled to fit a normalized movement space, such as using a uniform scaling factor as described in graph 602 of FIG. 6. However, to center the mechanical center 711 at the midpoint center of the normalized movement space, a shifted circular perimeter zone is employed. This perimeter zone is indicated in FIG. 7 as zone 720.

Perimeter zone 720 is a region of movement about the mechanical center. The size can be predefined or established based on variable factors and a combination of factors. For example, the size of perimeter zone 720 can be selected based on distance between cardinal center 710 and mechanical center 711, such as a multiplier applied the distance. The size of perimeter zone 720 can be selected to preserve accuracy of movement at a periphery of the normalized movement space, such as to maintain uniform movement response across the entire periphery of the normalized movement space. This uniform movement response can have a threshold limit of movement distortion at the periphery, and the perimeter zone size (among other selections, such as weighting functions) can be selected to maintain this distortion below the threshold limit at the periphery of the normalized movement space. In a first example, the perimeter zone size can be selected to ensure that the perimeter zone size does not create a perimeter zone that abuts or approaches too closely to the edges of the scaled movement data or normalized movement space. A predetermined buffer distance can be established which limits how close a perimeter zone can approach edges of the scaled movement data and normalized movement space. This buffer distance can help to ensure that distortion at the periphery is minimized when a mapping function or weighting function is applied. In further examples, the perimeter zone size can exceed the edges of the normalized movement space. In these further examples, the accuracy of mapped/scaled movement data at a periphery of the normalized movement space can be preserved by selecting an appropriate mapping function or weighting function, as discussed below.

This perimeter zone 720 is then shifted to move the mechanical center to the midpoint center of the normalized movement space. Perimeter zone 720 might include cardinal center 710 which might get shifted as well by inclusion in the perimeter zone. Then, mapping is performed using one or more weighting functions that are applied to the perimeter zone data for the space previously occupied by perimeter zone 720. FIG. 7 shows three example weighting functions, namely a conic function 705, a conic squared function 706, and a conic cubed function 707. Resultant mapping of the perimeter zone can be seen in each of graphs 702, 703, and 704. Each weighting function can establish a weighted interpolation between the shifted perimeter zone values and the unshifted perimeter zone values using an associated weighting function of the distance 'r' between any given input point that is within the perimeter zone and the mechanical center. An output position of mapped perimeter zone data values can be established as: (output mapped perimeter zone value)=W(r)*(shifted perimeter zone value)+(1−W(r))*(unshifted perimeter zone value) where 0≤W(r)≤1 is the weighting function. An example of a suitable weighting function is:

$$W(r) = \begin{cases} 1 & r \leq r_{min} \\ \left(\frac{r_{max} - r}{r_{max} - r_{min}}\right)^n & r_{min} < r < r_{max} \\ 0 & r \geq r_{max} \end{cases}$$

where, 'r' is the distance between any given input point that is within the perimeter zone and the mechanical center, $r_{min}$ is the radius of an optional protected region around the mechanical center which has uniform movement response to prevent mapping from affecting the size of any optional deadzone ($r_{min}=0$ eliminates this region), $r_{max}$ is the radius of perimeter zone 720, and 'n' is the power of the weighting (i.e. n=1 for conic weighting, n=2 for conic weighting squared, n=3 for conic weighting cubed). This weighting function has a value of '1' in a center (i.e. when r is smaller than $r_{min}$) and '0' when 'r' is large to have the same general shape as the conic functions.

Advantageously, use of perimeter zone 720 constrains any associated distortion to a circular zone around the mechanical center and maintains a linear response at the periphery of the movement space. These weighting functions can advantageously concentrate any distortions to the center of the normalized movement space to minimize perceptibility to a user, and provide smoother transitions at the edges of the movement space to minimize scaling zone transitions.

As an alternative example to the limited-size perimeter zone 720 shown in FIG. 7, the entire normalized movement space may be interpolated. To achieve this, $r_{max}$ (such as the $r_{max}$ from the previous example weighting function) is defined not as the radius of perimeter zone 720, but as the distance between the mechanical center and the closer of the two intersection points between the perimeter of the normalized input space and the line defined by the mechanical center and the input point. This approach, in contrast to the use of perimeter zone 720, spreads distortion evenly throughout the input space while shifting the mechanical center to the midpoint center of the normalized movement space and maintaining an undistorted circular perimeter that utilizes the entire input space. In some examples, this even distortion may be preferred to the concentrated distortion created through the use of perimeter zone 720.

Figure 8:
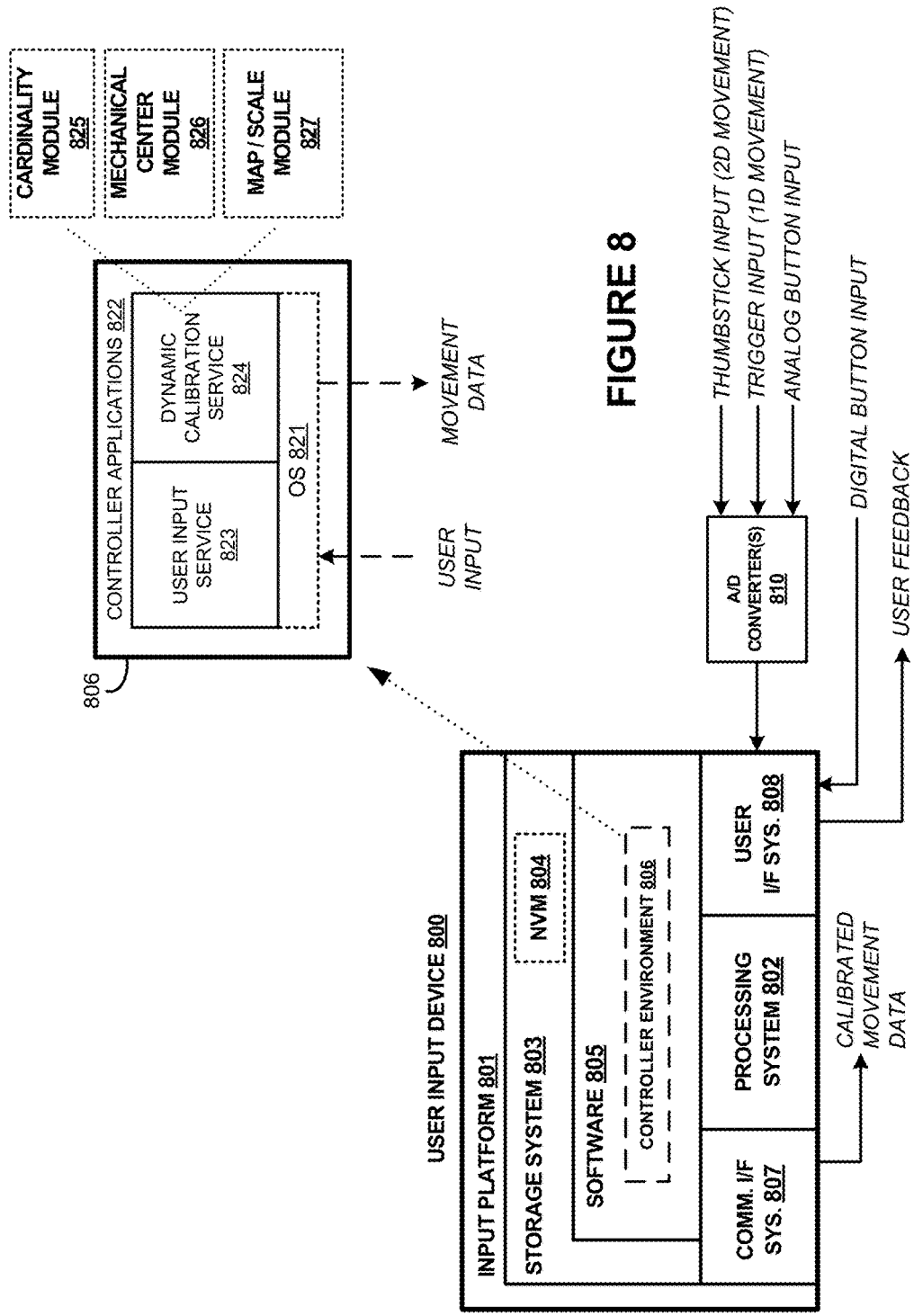
FIG. 8 illustrates an example user input device suitable for implementing any of the architectures, processes, methods, and operational scenarios disclosed herein.

FIG. 8 illustrates user input device 800 that is representative of any system or collection of systems in which the various dynamic calibration operational architectures, scenarios, and processes disclosed herein may be implemented. For example, user input device 800 can be employed in control circuitry 130 of FIG. 1, control stick 310 of FIG. 3, or to establish any of the centering, scaling, mapping, weighting, or calibration processes of FIGS. 1-7. Examples of user input device 800 can be incorporated into further devices and systems, such as virtual reality devices, augmented reality devices, gaming machines, gaming platforms, laptop computers, tablet computers, desktop computers, servers, cloud computing platforms, hybrid computers, virtual machines, smart televisions, smart watches and other wearable devices, as well as any variation or combination thereof. User input device 800 might also be incorporated into user interface systems for aviation, military, vehicular operation, robotic control, or industrial control systems User input device 800 includes input platform 801 and may be implemented as a single apparatus, system, or device or may be implemented in a distributed manner as multiple apparatuses, systems, or devices. For example, user input device 800 can comprise one or more microcontrollers, microprocessors, application-specific integrated circuits (ASICs), field-programmable gate arrays (FPGA), or discrete logic and associated circuitry, including combinations thereof. Input platform 801 may optionally include additional devices, features, or functionality not discussed for purposes of brevity.

Input platform 801 comprises processing system 802, storage system 803, software 805, communication interface system 807, and user interface system 808. Processing system 802 is operatively coupled with storage system 803, communication interface system 807, and user interface system 808. Storage system 803 can optionally include non-volatile memory (NVM) 804, which can comprise a programmable read-only memory, electrically-erasable programmable read-only memory (EEPROM), or flash memory, among other non-volatile memory types. When included, NVM 804 can store calibration data, sampled data, sample sets, or other measurement data and associated information.

Processing system 802 loads and executes software 805 from storage system 803. Software 805 includes controller environment 806, which is representative of the touch processes discussed with respect to the preceding Figures. When executed by processing system 802 to enhance input processing and handling for gaming controller applications, software 805 directs processing system 802 to operate as described herein for at least the various processes, operational scenarios, and sequences discussed in the foregoing implementations. Input platform 801 may optionally include additional devices, features, or functionality not discussed for purposes of brevity.

Referring still to FIG. 8, processing system 802 may comprise a micro-processor and processing circuitry that retrieves and executes software 805 from storage system 803. Processing system 802 may be implemented within a single processing device, but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. Storage system 803 can include non-volatile memory 804, which can comprise a programmable read-only memory, electrically-erasable programmable read-only memory (EEPROM), or flash memory, among other non-volatile memory types.

In addition to computer readable storage media, in some implementations storage system 803 may also include computer readable communication media over which at least some of software 805 may be communicated internally or externally. Storage system 803 may be implemented as a single storage device, but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein. For example, software 805 may include program instructions for implementing enhanced calibration processing and handling for gaming systems.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software or other application software, in addition to or that include controller environment 806. Software 805 may also comprise firmware or some other form of machine-readable processing instructions executable by processing system 802.

In general, software 805 may, when loaded into processing system 802 and executed, transform a suitable apparatus, system, or device (of which input platform 801 is representative) overall from a general-purpose computing system into a special-purpose computing system customized to facilitate enhanced touch input processing and handling for applications. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Controller environment 806 includes one or more controller applications 822 comprising user input service 823 and dynamic calibration service 824. Controller environment 806 also optionally includes operating system 821. OS 821 can provide a software platform on which user input service 823 and dynamic calibration service 824 is executed. User input service 823 comprises a movement interface that receives movement signals or movement data representative of user manipulation. The movement signals or movement data can be received through user interface system 808, such as from control sticks, thumbsticks, triggers, buttons, touch controls, motion controls, keyboards, keypads, or other user input hardware. User input service 823 can provide feedback to users in examples where indicator lights, video screens, vibration feedback, or resistance features are provided in user input device 800. Dynamic calibration service 824 performs calibration processes on measurement data associated with the various user input mechanisms, such as control sticks. Dynamic calibration service 824 can perform any of the calibration processes described here. For example, user input service 823 can receive measurement data captured by user interface elements, such as by A/D conversion circuitry associated with user input elements, and provide this measurement data to dynamic calibration service 824. Dynamic calibration service 824 performs centering, scaling, and mapping of the measurement data to normalized movement spaces based on dynamic calibration using cardinal extreme movement information and mechanical center information. Dynamic calibration service 824 provides calibrated and normalized movement data as output data. This output data can be transferred by communication interface system 807 in some examples for delivery to a host system or gaming system to control user interface elements. In other examples, dynamic calibration service 824 can provide this output data over one or more software or logical interfaces for use by gaming systems to control user interface elements.

In one example, dynamic calibration service 824 includes several individual modules for performing the processes described herein, namely, cardinality module 825, mechanical center module 826, and map/scale module 827. Cardinality module 825 determines cardinal extreme reference points based at least on maximum excursions for measurement data which can include applying an averaging function to the sequence of maximum excursions at each cardinal extreme. Cardinality module 825 can also determine cardinal centers based on the measurement data and the cardinal extreme reference points, among other operations. Cardinality module 825 can establish cardinal extreme qualification zones. Mechanical center module 826 determines mechanical centers for movement data based in part on resting points for associated input device elements, such as control sticks. Mechanical center module 826 can establish qualification zones for a sequence of resting points to aid in determining mechanical center points, among other operations. Map/scale module 827 can scale measurement data to fit normalized movement spaces, shift or re-center measurement data to place a mechanical center at a midpoint center of a normalized movement space or to align with a cardinal center, establish perimeter regions to shift mechanical centers to midpoint centers of normalized movement spaces, and map the shifted data according to one or more weighting or mapping functions, among other operations.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

User interface system 808 can include circuitry elements or processing elements for receiving user manipulation data associated with user input elements. Various circuitry can be employed to sense user input, translate the input from an analog signal to digital signaling, and transfer the digital signals to elements of processing system 802. Amplifiers, filters, or other signal processing circuitry can be employed to modify the signals generated by user input. For examples, user interface system 808 can include A/D conversion circuitry to convert analog signaling associated with user input elements into digital representations. In other examples, external A/D conversion circuitry 810 is provided and user interface system 808 can include one or more digital interfaces for communicating and controlling A/D conversion circuitry 810 or user input device equipment.

User interface system 808 can include output devices such as a display, speakers, haptic devices, indicator lights, force feedback elements, and other types of output devices. User interface system 808 might provide output or receive input over a network interface, such as communication interface system 807 that communicates with individual user input elements. User interface system 808 may also include associated user interface software executable by processing system 802 in support of the various user input and output devices discussed above.

Communication between input platform 801 and other systems (not shown), may occur over a communication network or networks and in accordance with various communication protocols, combinations of protocols, or variations thereof. Examples include intranets, internees, the Internet, local area networks, wide area networks, wireless networks, wired networks, virtual networks, personal area networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), Bluetooth interfaces (such as IEEE 802.15.1), WiFi (IEEE 802.11), as well as any other suitable communication protocol, variation, or combination thereof. Wired and wireless links can be employed for input platform 801 to communicate with a gaining system, host system, or other system that hosts a user interface platform which a user employs user input device 800 to control user interface elements.

Certain inventive aspects may be appreciated from the foregoing disclosure, of which the following are various examples.

EXAMPLE 1

A user input device, comprising a control stick mechanism configured to receive user manipulation in one or more axes. The user input device includes control circuitry configured to process movement data representative of the user manipulation to determine mapped movement data over a normalized movement space according to at least one of a mechanical center associated with the control stick mechanism and cardinality data defining a measured movement space associated with the control stick mechanism. The control circuitry configured to present the mapped movement data for use in controlling one or more user interface elements with the control stick mechanism.

EXAMPLE 2

The user input device of Example 1, comprising the control circuitry configured to establish the mapped movement data by at least determining scaled movement data to fit the movement data to the normalized movement space according to at least a scaling function and cardinal extreme reference points of the cardinality data.

EXAMPLE 3

The user input device of Examples 1-2, comprising the control circuitry further configured to establish the mapped movement data by at least mapping the scaled movement data using one or more weighting functions to distribute the scaled movement data within the normalized movement space to position the mechanical center at the midpoint center of the normalized movement space while the cardinal extreme reference points are aligned with a perimeter of the normalized movement space.

EXAMPLE 4

The user input device of Examples 1-3, comprising the control circuitry configured to establish a perimeter zone about a mechanical center in the measured movement space, shift the movement data in the perimeter zone to place the mechanical center at a midpoint center of the normalized movement space, and apply a weighting function to distribute shifted movement data within the perimeter zone and establish the mapped movement data, wherein the weighting function constrains distortion from interpolation of the shifted movement data to within the perimeter zone and maintains a linear response at a periphery of the normalized movement space.

EXAMPLE 5

The user input device of Examples 1-4, comprising the control circuitry configured to apply a scaling function to the movement data to determine scaled movement data that scales the measured movement space to fit the normalized movement space according to cardinal extreme reference points derived from the movement data for the measured movement space, and map the scaled movement data to align the mechanical center with a midpoint center of the normalized movement space, wherein a weighting function spreads distortion from mapping the scaled movement data throughout the normalized movement space and maintains undistorted scaled movement data at a periphery of the normalized movement space.

EXAMPLE 6

The user input device of Examples 1-5, comprising the control circuitry configured to process the movement data to derive the mechanical center of the control stick mechanism from at least a sequence of qualified resting points associated with the control stick mechanism. The control circuitry configured to at least re-center the movement data according to the mechanical center to establish the mapped movement data.

EXAMPLE 7

The user input device of Examples 1-6, comprising the control circuitry configured to determine the qualified resting points as when the movement data indicates the control stick mechanism comes to a rest within at least a center qualification zone after exiting and re-entering the center qualification zone, where the rest comprises the movement data indicating a change in the movement data as being less than a threshold distance for more than a threshold amount of time that occurs within a further threshold amount of time of the movement data indicating entry into the center qualification zone, where the center qualification zone comprises an adaptive size derived from a distribution of the qualified resting points around the mechanical center, the distribution of the qualified resting points changing during operation of the control stick mechanism due to at least mechanical variation of the control stick mechanism.

EXAMPLE 8

The user input device of Examples 1-7, comprising the control circuitry configured to determine the cardinality data by at least determining cardinal extreme reference points for the measured movement space of the control stick mechanism and determining a cardinal center among the cardinal extreme reference points, the cardinal extreme reference points each derived from an associated sequence of transit extremes qualified within associated cardinal extreme qualification zones.

EXAMPLE 9

A method of operating a user input device, the method comprising, in a control stick mechanism, receiving user manipulation in one or more axes. The method comprising, in control circuitry, processing movement data representative of the user manipulation to determine mapped movement data over a normalized movement space according to at least one of a mechanical center associated with the control stick mechanism and cardinality data defining a measured movement space associated with the control stick mechanism. The method comprising, in the control circuitry, presenting the mapped movement data for use in controlling one or more user interface elements with the control stick mechanism.

EXAMPLE 10

The method of Example 9, further comprising, in the control circuitry, establishing the mapped movement data by at least determining scaled movement data to fit the movement data to the normalized movement space according to at least a scaling function and cardinal extreme reference points of the cardinality data.

EXAMPLE 11

The method of Examples 9-10, further comprising, in the control circuitry, further establishing the mapped movement data by at least mapping the scaled movement data using one or more weighting functions to distribute the scaled movement data within the normalized movement space to position the mechanical center at the midpoint center of the normalized movement space while the cardinal extreme reference points are aligned with a perimeter of the normalized movement space.

EXAMPLE 12

The method of Examples 9-11, further comprising, in the control circuitry, establishing a perimeter zone about a mechanical center in the measured movement space, shifting the movement data in the perimeter zone to place the mechanical center at a midpoint center of the normalized movement space, and applying a weighting function to distribute shifted movement data within the perimeter zone and establish the mapped movement data, wherein the weighting function constrains distortion from interpolation of the shifted movement data to within the perimeter zone and maintains a linear response at a periphery of the normalized movement space.

EXAMPLE 13

The method of Examples 9-12, further comprising, in the control circuitry, applying a scaling function to the movement data to determine scaled movement data that scales the measured movement space to fit the normalized movement space according to cardinal extreme reference points derived from the movement data for the measured movement space, and mapping the scaled movement data to align the mechanical center with a midpoint center of the normalized movement space, wherein a weighting function spreads distortion from mapping the scaled movement data throughout the normalized movement space and maintains undistorted scaled movement data at a periphery of the normalized movement space.

EXAMPLE 14

The method of Examples 9-13, further comprising in the control circuitry, processing the movement data to derive a mechanical center of the control stick mechanism from at least a sequence of qualified resting points associated with the control stick mechanism. The method comprising, in the control circuitry, re-centering the movement data according to the mechanical center to establish the mapped movement data.

EXAMPLE 15

The method of Examples 9-14, further comprising, in the control circuitry, determining the qualified resting points as when the movement data indicates the control stick mechanism comes to a rest within at least a center qualification zone after exiting and re-entering the center qualification zone, where the rest comprises the movement data indicating a change in the movement data as being less than a threshold distance for more than a threshold amount of time that occurs within a further threshold amount of time of the movement data indicating entry into the center qualification zone, where the center qualification zone comprises an adaptive size derived from a distribution of the qualified resting points around the mechanical center, the distribution of the qualified resting points changing during operation of the control stick mechanism due to at least mechanical variation of the control stick mechanism.

EXAMPLE 16

The method of Examples 9-15, further comprising, in the control circuitry, determining the cardinality data by at least determining cardinal extreme reference points for the measured movement space of the control stick mechanism and determining a cardinal center among the cardinal extreme reference points, the cardinal extreme reference points each derived from an associated sequence of transit extremes qualified within associated cardinal extreme qualification zones.

EXAMPLE 17

A gaming controller platform, comprising a movement interface configured to receive movement data representative of user manipulation of a control stick mechanism in a gaming controller. The gaming controller platform comprising a calibration service configured to process movement data representative of the user manipulation to determine mapped movement data over a normalized movement space according to at least one of a mechanical center associated with the control stick mechanism and cardinality data defining a measured movement space associated with the control stick mechanism. The calibration service configured to present the mapped movement data for use in controlling one or more user interface elements with the control stick mechanism.

EXAMPLE 18

The gaming controller platform of Example 17, comprising the calibration service configured to determine scaled movement data to fit the movement data to the normalized movement space according to at least a scaling function and cardinal extreme reference points of the cardinality data. The calibration service configured to map the scaled movement data using one or more weighting functions to distribute the scaled movement data within the normalized movement space to position the mechanical center at the midpoint center of the normalized movement space while the cardinal extreme reference points are aligned with a perimeter of the normalized movement space.

EXAMPLE 19

The gaming controller platform of Examples 17-18, comprising the calibration service configured to establish a perimeter zone about a mechanical center in the measured movement space, shift the movement data in the perimeter zone to place the mechanical center at a midpoint center of the normalized movement space, and apply a weighting function to distribute shifted movement data within the perimeter zone and establish the mapped movement data, wherein the weighting function constrains distortion from interpolation of the shifted movement data to within the perimeter zone and maintains a linear response at a periphery of the normalized movement space.

EXAMPLE 20

The gaming controller platform of Examples 17-19, comprising the calibration service configured to apply a scaling function to the movement data to determine scaled movement data that scales the measured movement space to fit the normalized movement space according to cardinal extreme reference points derived from the movement data for the measured movement space, and map the scaled movement data to align the mechanical center with a midpoint center of the normalized movement space, wherein a weighting function spreads distortion from mapping the scaled movement data throughout the normalized movement space and maintains undistorted scaled movement data at a periphery of the normalized movement space.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A user input device, comprising:
   a control stick mechanism configured to receive user manipulation in one or more axes;
   control circuitry configured to modify movement data representative of the user manipulation to determine mapped movement data by at least:
      determining scaled movement data to fit the movement data to a normalized movement space according to at least a scaling function and cardinal extreme reference points of cardinality data defining a measured movement space associated with the control stick mechanism; and
      mapping the scaled movement data using one or more weighting functions to distribute the scaled movement data within the normalized movement space to position a mechanical center associated with the control stick mechanism at a midpoint center of the normalized movement space while the cardinal extreme reference points are aligned with a perimeter of the normalized movement space; and
   the control circuitry configured to present the mapped movement data for use in controlling one or more user interface elements with the control stick mechanism.

2. The user input device of claim 1, comprising:
   the control circuitry configured to establish a perimeter zone about the mechanical center in the measured movement space, shift the movement data in the perimeter zone to place the mechanical center at the midpoint center of the normalized movement space, and apply a selected weighting function to distribute shifted movement data within the perimeter zone and further establish the mapped movement data, wherein the selected weighting function constrains distortion from interpolation of the shifted movement data to within the perimeter zone and maintains a linear response at a periphery of the normalized movement space.

3. The user input device of claim 1, comprising:
   the control circuitry configured to apply the scaling function to the movement data to determine the scaled movement data that scales the measured movement space to fit the normalized movement space according to the cardinal extreme reference points derived from the movement data for the measured movement space, and map the scaled movement data to align the mechanical center with the midpoint center of the normalized movement space, wherein a selected weighting function spreads distortion from mapping the scaled movement data throughout the normalized movement space and maintains undistorted scaled movement data at a periphery of the normalized movement space.

4. The user input device of claim 1, comprising:
the control circuitry configured to process the movement data to derive the mechanical center of the control stick mechanism from at least a sequence of qualified resting points associated with the control stick mechanism.

5. The user input device of claim 4, comprising:
the control circuitry configured to determine the qualified resting points as when the movement data indicates the control stick mechanism comes to a rest within at least a center qualification zone after exiting and re-entering the center qualification zone, wherein the rest comprises the movement data indicating a change in the movement data as being less than a threshold distance for more than a threshold amount of time that occurs within a further threshold amount of time of the movement data indicating entry into the center qualification zone;
wherein the center qualification zone comprises an adaptive size derived from a distribution of the qualified resting points around the mechanical center, the distribution of the qualified resting points changing during operation of the control stick mechanism due to at least mechanical variation of the control stick mechanism.

6. The user input device of claim 1, comprising:
the control circuitry configured to determine the cardinality data by at least determining the cardinal extreme reference points for the measured movement space of the control stick mechanism and determining a cardinal center among the cardinal extreme reference points, the cardinal extreme reference points each derived from an associated sequence of transit extremes qualified within associated cardinal extreme qualification zones.

7. A method of operating a user input device, the method comprising:
in a control stick mechanism, receiving user manipulation in one or more axes;
in control circuitry, modifying movement data representative of the user manipulation to determine mapped movement data by at least:
determining scaled movement data to fit the movement data to a normalized movement space according to at least a scaling function and cardinal extreme reference points of cardinality data defining a measured movement space associated with the control stick mechanism; and
mapping the scaled movement data using one or more weighting functions to distribute the scaled movement data within the normalized movement space to position a mechanical center associated with the control stick mechanism at a midpoint center of the normalized movement space while the cardinal extreme reference points are aligned with a perimeter of the normalized movement space; and
in the control circuitry, presenting the mapped movement data for use in controlling one or more user interface elements with the control stick mechanism.

8. The method of claim 7, further comprising:
in the control circuitry, establishing a perimeter zone about the mechanical center in the measured movement space, shifting the movement data in the perimeter zone to place the mechanical center at the midpoint center of the normalized movement space, and applying a selected weighting function to distribute shifted movement data within the perimeter zone and further establish the mapped movement data, wherein the selected weighting function constrains distortion from interpolation of the shifted movement data to within the perimeter zone and maintains a linear response at a periphery of the normalized movement space.

9. The method of claim 7, further comprising:
in the control circuitry, applying the scaling function to the movement data to determine the scaled movement data that scales the measured movement space to fit the normalized movement space according to the cardinal extreme reference points derived from the movement data for the measured movement space, and mapping the scaled movement data to align the mechanical center with the midpoint center of the normalized movement space, wherein a selected weighting function spreads distortion from mapping the scaled movement data throughout the normalized movement space and maintains undistorted scaled movement data at a periphery of the normalized movement space.

10. The method of claim 7, further comprising:
in the control circuitry, processing the movement data to derive a mechanical center of the control stick mechanism from at least a sequence of qualified resting points associated with the control stick mechanism.

11. The method of claim 10, further comprising:
in the control circuitry, determining the qualified resting points as when the movement data indicates the control stick mechanism comes to a rest within at least a center qualification zone after exiting and re-entering the center qualification zone, wherein the rest comprises the movement data indicating a change in the movement data as being less than a threshold distance for more than a threshold amount of time that occurs within a further threshold amount of time of the movement data indicating entry into the center qualification zone;
wherein the center qualification zone comprises an adaptive size derived from a distribution of the qualified resting points around the mechanical center, the distribution of the qualified resting points changing during operation of the control stick mechanism due to at least mechanical variation of the control stick mechanism.

12. The method of claim 7, further comprising:
in the control circuitry, determining the cardinality data by at least determining the cardinal extreme reference points for the measured movement space of the control stick mechanism and determining a cardinal center among the cardinal extreme reference points, the cardinal extreme reference points each derived from an associated sequence of transit extremes qualified within associated cardinal extreme qualification zones.

13. A gaming controller platform, comprising:
a movement interface configured to receive movement data representative of user manipulation of a control stick mechanism in a gaming controller;
a calibration service configured to modify movement data representative of the user manipulation to determine mapped movement data by at least:
determining scaled movement data to fit the movement data to a normalized movement space according to at least a scaling function and cardinal extreme reference points of cardinality data defining a measured movement space associated with the control stick mechanism; and
mapping the scaled movement data using one or more weighting functions to distribute the scaled movement data within the normalized movement space to position a mechanical center associated with the control stick mechanism at a midpoint center of the normalized movement space while the cardinal extreme reference points are aligned with a perimeter of the normalized movement space; and the calibration service configured to present the mapped movement data for use in controlling one or more user interface elements with the control stick mechanism.

14. The gaming controller platform of claim 13, comprising:

the calibration service configured to establish a perimeter zone about the mechanical center in the measured movement space, shift the movement data in the perimeter zone to place the mechanical center at the midpoint center of the normalized movement space, and apply a selected weighting function to distribute shifted movement data within the perimeter zone and further establish the mapped movement data, wherein the selected weighting function constrains distortion from interpolation of the shifted movement data to within the perimeter zone and maintains a linear response at a periphery of the normalized movement space.

15. The gaming controller platform of claim 13, comprising:

the calibration service configured to apply the scaling function to the movement data to determine the scaled movement data that scales the measured movement space to fit the normalized movement space according to the cardinal extreme reference points derived from the movement data for the measured movement space, and map the scaled movement data to align the mechanical center with the midpoint center of the normalized movement space, wherein a selected weighting function spreads distortion from mapping the scaled movement data throughout the normalized movement space and maintains undistorted scaled movement data at a periphery of the normalized movement space.

16. A user input device, comprising:

a control stick mechanism configured to receive user manipulation in one or more axes;

control circuitry configured to modify movement data representative of the user manipulation to determine mapped movement data by at least:

establishing a perimeter zone about a mechanical center in a measured movement space defined by cardinality data associated with the control stick mechanism;

shifting the movement data in the perimeter zone to place the mechanical center at a midpoint center of a normalized movement space; and applying a weighting function to distribute shifted movement data within the perimeter zone and establish the mapped movement data, wherein the weighting function constrains distortion from interpolation of the shifted movement data to within the perimeter zone and maintains a linear response at a periphery of the normalized movement space; and the control circuitry configured to present the mapped movement data for use in controlling one or more user interface elements with the control stick mechanism.

17. A user input device, comprising:

a control stick mechanism configured to receive user manipulation in one or more axes;

control circuitry configured to modify movement data representative of the user manipulation to determine mapped movement data by at least:

applying a scaling function to the movement data to determine scaled movement data that scales a measured movement space defined by cardinality data associated with the control stick mechanism to fit a normalized movement space according to cardinal extreme reference points derived from the movement data for the measured movement space; and mapping the scaled movement data to align the mechanical center with a midpoint center of the normalized movement space, wherein a weighting function spreads distortion from mapping the scaled movement data throughout the normalized movement space and maintains undistorted scaled movement data at a periphery of the normalized movement space; and the control circuitry configured to present the mapped movement data for use in controlling one or more user interface elements with the control stick mechanism.

18. A method of operating a user input device, the method comprising:

in a control stick mechanism, receiving user manipulation in one or more axes;

in control circuitry, modifying movement data representative of the user manipulation to determine mapped movement data by at least:

establishing a perimeter zone about a mechanical center in a measured movement space defined by cardinality data associated with the control stick mechanism;

shifting the movement data in the perimeter zone to place the mechanical center at a midpoint center of a normalized movement space; and applying a weighting function to distribute shifted movement data within the perimeter zone and establish the mapped movement data, wherein the weighting function constrains distortion from interpolation of the shifted movement data to within the perimeter zone and maintains a linear response at a periphery of the normalized movement space; and in the control circuitry, presenting the mapped movement data for use in controlling one or more user interface elements with the control stick mechanism.

19. A method of operating a user input device, the method comprising:

in a control stick mechanism, receiving user manipulation in one or more axes;

in control circuitry, modifying movement data representative of the user manipulation to determine mapped movement data by at least:

applying a scaling function to the movement data to determine scaled movement data that scales a measured movement space defined by cardinality data associated with the control stick mechanism to fit a normalized movement space according to cardinal extreme reference points derived from the movement data for the measured movement space; and mapping the scaled movement data to align the mechanical center with a midpoint center of the normalized movement space, wherein a weighting function spreads distortion from mapping the scaled movement data throughout the normalized movement space and maintains undistorted scaled movement data at a periphery of the normalized movement space; and in the control circuitry, presenting the mapped movement data for use in controlling one or more user interface elements with the control stick mechanism.

\* \* \* \* \*